US011952833B1

(12) United States Patent
Wermers et al.

(10) Patent No.: US 11,952,833 B1
(45) Date of Patent: Apr. 9, 2024

(54) BUILDING SYSTEMS AND METHODS FOR INSTALLING BUILDING SYSTEMS RELATIVE TO BUILDING OPENINGS

(71) Applicant: Larson Manufacturing Company of South Dakota, Inc., Brookings, SD (US)

(72) Inventors: Sara Wermers, Brookings, SD (US); Alan M. Dixon, Brookings, SD (US); Matthew Gingery, Coon Rapids, MN (US); Kelly D. Nordgaard, Gary, SD (US); Luke A. Thompson, Volga, SD (US); Bryan P. Zacher, Brookings, SD (US); Jammey A. Rawden, Volga, SD (US); Todd N. Stratmoen, Brookings, SD (US); Michael W. Kondratuk, Brookings, SD (US)

(73) Assignee: Larson Manufacturing Company of South Dakota, LLC, Brookings, SD (US)

( * ) Notice: Subject to any disclaimer, the term of this patent is extended or adjusted under 35 U.S.C. 154(b) by 465 days.

(21) Appl. No.: 17/018,939

(22) Filed: Sep. 11, 2020

Related U.S. Application Data

(60) Provisional application No. 62/898,902, filed on Sep. 11, 2019.

(51) Int. Cl.

| | |
|---|---|
| ***E06B 3/70*** | (2006.01) |
| ***E06B 1/32*** | (2006.01) |
| ***E06B 1/52*** | (2006.01) |
| ***E06B 3/36*** | (2006.01) |

(52) U.S. Cl.
CPC .................. *E06B 3/70* (2013.01); *E06B 1/32* (2013.01); *E06B 1/52* (2013.01); *E06B 3/36* (2013.01); *E06B 2003/7046* (2013.01); *E06B 2003/7049* (2013.01); *E06B 2003/7059* (2013.01)

(58) Field of Classification Search
CPC ....... E05D 7/06; E05D 7/0415; E05D 7/0407; E05D 7/04; E05D 2007/0492; E05D 2007/0484; E05D 2007/0469; E05D 2007/0461; E06B 3/70; E06B 3/36; E06B 2003/7046; E06B 2003/7049; E06B 2003/7059
See application file for complete search history.

(56) References Cited

U.S. PATENT DOCUMENTS 730,265 A * 6/1903 Hill ....................... E05D 7/0423 16/245
3,205,982 A * 9/1965 Chimienti ................. E06B 7/00 206/325

(Continued)

FOREIGN PATENT DOCUMENTS

CA 2900078 A1 9/2014

*Primary Examiner* — Justin B Rephann
(74) *Attorney, Agent, or Firm* — Kagan Binder, PLLC

(57) ABSTRACT

Building systems including a frame with a horizontal member from which first and second vertical bars downwardly extend and a panel attached to the frame. The building systems include at least one of an integrated fastener cover that is moveable to a closed position that covers a portion of a fastener, a gusset assembly with a junction cover positioned at a corner junction between two adjacent portions of a panel, and hinge assemblies that reduce the sagging of a panel, such as a door.

14 Claims, 30 Drawing Sheets

B - B

B - B

(56) References Cited

U.S. PATENT DOCUMENTS

| | | | | | |
|---|---|---|---|---|---|
| 4,505,080 | A * | 3/1985 | Sailor | E06B 1/64 | 52/211 |
| 4,719,729 | A * | 1/1988 | Wynar | E06B 1/64 | 52/211 |
| 5,230,180 | A * | 7/1993 | Tweedt | E06B 1/60 | 49/495.1 |
| 5,293,723 | A * | 3/1994 | Slessor | E06B 1/30 | 49/504 |
| 5,339,493 | A * | 8/1994 | MacIntyre | E05D 7/0423 | 16/237 |
| 5,378,077 | A * | 1/1995 | Paulsen | E06B 3/9682 | 403/402 |
| 5,483,771 | A * | 1/1996 | Herbst | E05D 5/04 | 49/504 |
| 5,701,636 | A * | 12/1997 | Jahnke | E05D 7/0423 | 16/237 |
| 5,832,670 | A * | 11/1998 | Bennett | E05D 7/02 | 49/504 |
| 6,311,454 | B1 * | 11/2001 | Kempel | E06B 3/76 | 52/794.1 |
| 6,343,438 | B1 * | 2/2002 | Boldt | E06B 1/62 | 49/504 |
| 7,117,639 | B2 | 10/2006 | Abdella et al. | | |
| 7,584,523 | B1 * | 9/2009 | Finkelstein | E05D 7/0423 | 16/271 |
| 7,661,226 | B2 * | 2/2010 | Kibbel | E05B 63/14 | 49/382 |
| 7,870,642 | B1 * | 1/2011 | Finkelstein | E05D 7/0423 | 16/242 |
| 8,857,105 | B2 | 10/2014 | Hemping et al. | | |
| 8,915,031 | B2 | 12/2014 | Dixon | | |
| 9,382,751 | B2 | 7/2016 | Hemping et al. | | |
| 9,624,722 | B2 | 4/2017 | Hummel et al. | | |
| 10,012,014 | B2 * | 7/2018 | Malott | E05F 1/063 | |
| 10,047,558 | B2 | 8/2018 | Hummel et al. | | |
| 10,526,835 | B2 | 1/2020 | Hemping et al. | | |
| 10,883,306 | B2 * | 1/2021 | Massey | E06B 3/9632 | |
| 11,441,349 | B2 * | 9/2022 | Dixon | E05F 3/22 | |
| 2002/0166299 | A1 * | 11/2002 | Day | E06B 3/9624 | 52/287.1 |
| 2003/0005641 | A1 * | 1/2003 | Eakes | E06B 7/28 | 49/380 |
| 2006/0150524 | A1 * | 7/2006 | Kibbel | E05B 63/14 | 49/501 |
| 2007/0022699 | A1 * | 2/2007 | Wang | E06B 1/30 | 52/656.4 |
| 2008/0172956 | A1 * | 7/2008 | Boldt | E06B 3/302 | 52/475.1 |
| 2009/0064609 | A1 * | 3/2009 | Ouyang | E06B 1/34 | 52/211 |
| 2011/0283624 | A1 * | 11/2011 | Baer | E05D 7/04 | 49/506 |
| 2013/0219813 | A1 * | 8/2013 | Gadoury | E06B 1/12 | 52/211 |
| 2014/0069038 | A1 * | 3/2014 | Back | E06B 1/32 | 52/745.15 |
| 2014/0102017 | A1 * | 4/2014 | Booi | E06B 1/56 | 52/204.1 |
| 2014/0102018 | A1 * | 4/2014 | Rochman | E06B 1/30 | 52/210 |
| 2014/0215759 | A1 * | 8/2014 | Mitchell | E05D 7/0423 | 16/235 |
| 2016/0069093 | A1 * | 3/2016 | Hawk | E04F 19/02 | 52/745.15 |
| 2016/0273251 | A1 * | 9/2016 | Malott | E05F 1/1215 | |
| 2016/0298374 | A1 | 10/2016 | Hemping et al. | | |
| 2018/0313148 | A1 | 11/2018 | Hummel et al. | | |

* cited by examiner

A - A

B - B

B - B

C - C

D - D

D - D

E - E

E - E

F - F

F - F

G - G

H - H

G - G

BUILDING SYSTEMS AND METHODS FOR INSTALLING BUILDING SYSTEMS RELATIVE TO BUILDING OPENINGS

CROSS-REFERENCE TO RELATED APPLICATIONS

This application claims priority to U.S. Provisional Patent Application No. 62/898,902, filed Sep. 11, 2019, the entire contents of which is incorporated herein by reference in its entirety.

TECHNICAL FIELD

This disclosure relates to building systems, such as quick-install door systems (e.g., secondary door systems) and window systems, methods for installing such building systems relative to building openings, and components thereof.

SUMMARY

Briefly, the present disclosure provides for building systems, methods of installing said systems, and various components thereof and/or related thereto. In particular, the present disclosure provides for door and window systems, assemblies, and related installation thereof, mounting frames that include preloaded fasteners, covers that can at least partially conceal fasteners once driven, various improvements related to sills of primary and/or secondary door assemblies, and improvements to door hinge assemblies that provide improved operation and aesthetics. Further features include a panel junction cover (e.g., a miter concealing cover), hold-open door closer features, features that minimize or prevent sagging of installed door and window panels, among others. It is an advantage of the present disclosure to provide a door system which may be installed rapidly, such as in less than ten minutes, with relatively few tools (e.g., only a screwdriver).

The preceding summary of the present disclosure is not intended to describe each embodiment of the present invention. The details of one or more embodiments of the invention are also set forth in the description below. Other features, objects, and advantages of the invention will be apparent from the description and from the claims.

All scientific and technical terms used herein have meanings commonly used in the art unless otherwise specified.

As used in this specification and the appended claims, the singular forms "a," "an," and "the" encompass embodiments having plural referents, unless the content clearly dictates otherwise.

As used in this specification and the appended claims, the term "or" is generally employed in its sense including "and/or" unless the content clearly dictates otherwise.

As used herein, "have," "having," "include," "including," "comprise," "comprising" or the like are used in their open ended sense, and generally mean "including, but not limited to." It will be understood that the terms "consisting of" and "consisting essentially of" are subsumed in the term "comprising," and the like.

In accordance with embodiments described herein, a building system is provided that includes a frame that includes a first horizontal member comprising a first end and an opposite second end, a first vertical bar downwardly extending from the first end of the horizontal member, and a second vertical bar downwardly extending from the second end of the horizontal member. The building system further includes a panel attached to the frame, wherein at least one of the first horizontal member and the first and second vertical bars includes at least one fastener-receiving portion and an integrated fastener cover that is moveable from an open position in which it does not cover the fastener-receiving portion to a closed position in which it covers the fastener-receiving portion.

In accordance with the above building system embodiments, the frame may be preassembled prior to installation. In addition, the first horizontal member may be positioned at a top of the frame, wherein the frame further comprises a second horizontal member positioned at a bottom of the frame. In addition, at least one of the first horizontal member and the first and second vertical bars may comprise a recessed fastener-receiving channel that comprises the at least one fastener-receiving portion. In addition, the integrated fastener cover may comprise a hinge connector at a first end and a closure feature at a second end that interfaces with a portion of the fastener-receiving portion in the closed position of the integrated fastener cover, wherein the closure feature may be located at an interface between the integrated fastener cover and at least one of the first horizontal member and a vertical mounting frame of one of the first and second vertical bars. The integrated fastener cover may be pivotably attached to one of first horizontal member and the first and second vertical bars that comprises the fastener-receiving portion.

In accordance with embodiments, a method is described of installing the building systems described above to a building, may include the steps of positioning the building system adjacent to a building opening and attaching the building system to the building opening by driving a fastener through each of at the at least one fastener-receiving portions of at least one of the first horizontal member and the first and second vertical bars. This method may further include closing the fastener cover over the open end of the fastener-receiving portion to at least partially conceal the fastener from view after the step of attaching the building system to the building opening.

In accordance with embodiments described herein, a building system is described that includes a frame including a horizontal member comprising a first end and an opposite second end, a first vertical bar downwardly extending from the first end of the horizontal member, and a second vertical bar downwardly extending from the second end of the horizontal member. The building system further includes a panel attached to one of the horizontal member and the first and second vertical bars of the frame, wherein the panel comprises a first portion adjacent to a second portion at a first corner junction, and wherein the panel comprises at least a first gusset assembly comprising a junction cover positioned at the first corner junction between the first and second portions of the panel.

The junction cover may be configured to give the first corner junction a substantially seamless appearance when the panel is assembled. The first gusset assembly may include a generally L-shaped member comprising a first leg that is positionable in a first recessed opening of the first portion of the panel and a second leg that is positionable in a second recessed opening of the second portion of the panel, wherein the junction cover comprises a junction cover length that extends along a first corner junction length and a junction cover width transverse to the junction cover length so that the junction cover width is sufficient to overlap a portion of at least one of the first and second portions of the panel adjacent to the first corner junction. The junction cover may have a substantially T-shaped cross-section, and/or the first corner junction may include a miter junction.

In accordance with embodiments described herein, a building system is described that includes a frame comprising a horizontal member comprising a first end and an opposite second end, a hinge-side vertical bar downwardly extending from the first end of the horizontal member, and a latch-side vertical bar downwardly extending from the second end of the horizontal member. The building system further includes a panel rotatably attached on a hinge side to the hinge-side vertical bar with at least a first hinge assembly and a second hinge assembly, wherein each of the first and second hinge assemblies comprises a frame hinge portion attached to the hinge-side vertical bar and a panel hinge portion attached to the panel, wherein the frame hinge portion is rotatably connected to the panel hinge portion, and wherein the first hinge assembly is configured so that its panel hinge portion is shorter than the panel hinge portion of the second hinge assembly in order to compensate for a panel sag angle. With these building systems, a first hinge assembly may be positioned near a top of the hinge-side vertical bar, wherein the second hinge assembly is positioned near a bottom of the hinge-side vertical bar.

With the described hinge configuration embodiments, the panel hinge portion of the first hinge assembly has a first flange portion and the panel hinge portion of the second hinge assembly has a second flange portion, wherein the first hinge assembly has a first hinge axis and the second hinge assembly has a second hinge axis, wherein the first hinge assembly has a first hinge axis to flange distance, wherein the second hinge assembly has a second hinge axis to flange distance, and wherein the first hinge axis to flange distance is less than the second hinge axis to flange distance. The system may include a third hinge assembly, wherein the first, second, and third hinge assemblies are configured to have progressively sized corresponding panel hinge portions according to a position of each hinge assembly on the hinge-side vertical bar. Finally, the frame hinge portion may be rotatably connected to the panel hinge portion with a spring-loaded pin and at least one bushing proximate to the panel hinge portion or the frame hinge portion of the hinge assembly.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
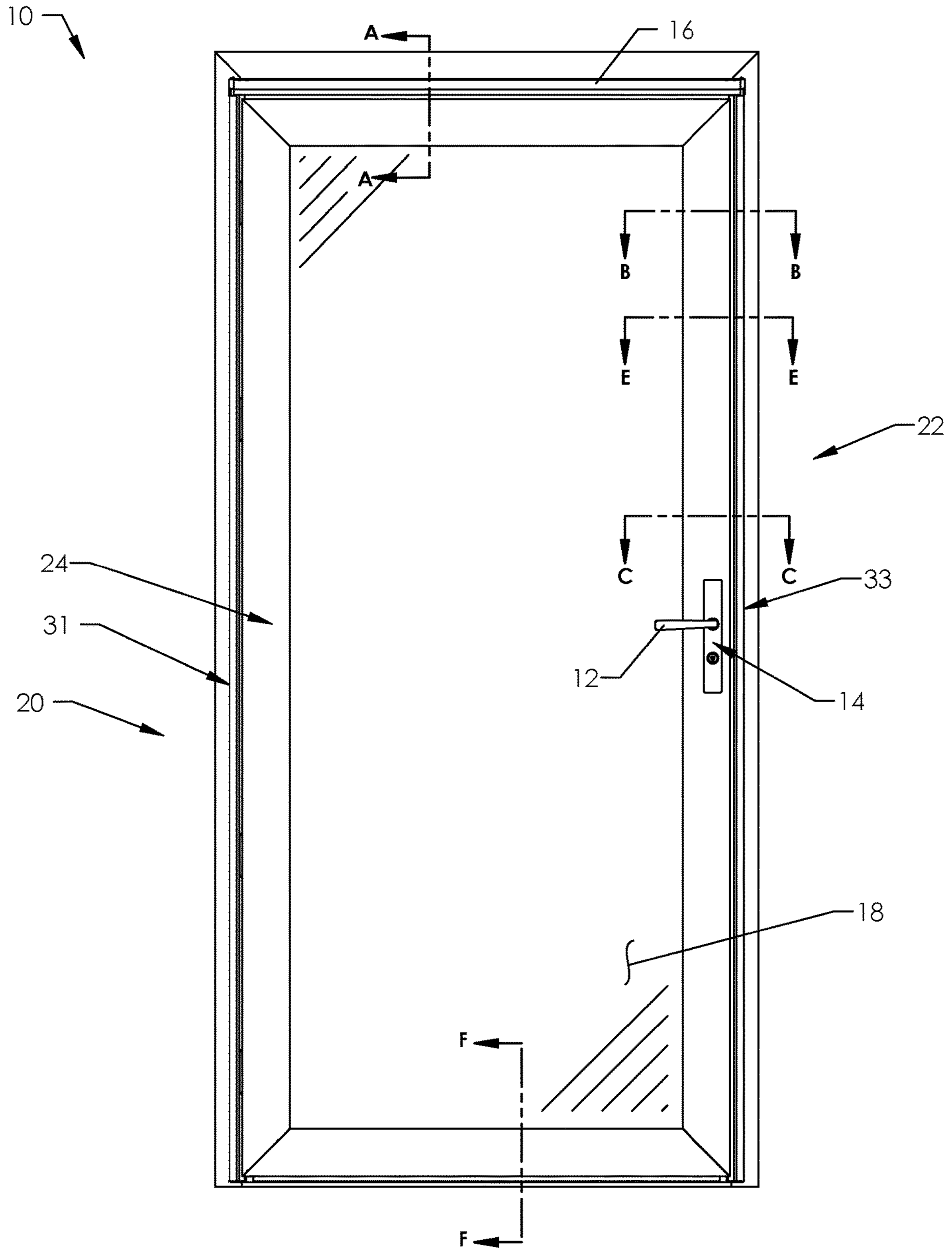
FIG. 1 is a front elevation view of an example door system, according to various embodiments.

The present disclosure provides building systems and installation methods and features thereof, such as an at least partially pre-assembled and ready-to-install, quick-to-install door system and various optional components thereof. The disclosed ready-to-install building systems and methods provide installation advantages when compared to, for example, a conventional or traditional residential secondary door installation kit. Typically, residential secondary doors are not shipped as pre-hung door assemblies, for example.

While much of the description herein refers specifically to doors and their installation relative to respective door openings, it is understood that the present disclosure also more generally encompasses other building systems and their installation relative to their respective building openings. For one example, the building systems described herein can also include window systems and the installation of windows in window openings of a building.

Applicant hereby incorporates by reference commonly-owned U.S. application Ser. No. 16/555,654, filed on Aug. 29, 2019, which claims the benefit under 35 U.S.C. § 119(e) of U.S. Provisional Patent Application No. 62/724,327, filed on Aug. 29, 2018, entitled "Ready to Install Door System" for all purposes herein.

The installation of embodiments of the present door system and assembly is quicker and more efficient than installing existing options, and accommodates a wider variety of installation variables and conditions. Pre-assembly of a door closer and lockset in the door system avoids the time-consuming steps of separate assembly and installation processes required by a conventional kit. In addition, the disclosed pre-assembled door system allows the installer to easily position and hang the door system in a framed door opening in a single operation. Even an installer with limited installation experience can easily install the door system. Embodiments of the present disclosure also include integrated load-bearing features that make installation more flexible with respect to an existing primary door and/or sill. In this disclosure, all the components for installation of a door system can be properly positioned in a single positioning step of the entire door system.

Further, pre-loading the installation screws or other fasteners in the disclosed screw or fastener-receiving channels prior to shipment and including door assembly supports below a threshold portion allows the installer to quickly drive the screws from the readily accessible front or "face" of the door system. Other embodiments include a door assembly that is configured to fit within a recessed primary door, and can include installation screws that are installed at a transverse, 90-degree angle to the face of the door system.

An optional cover can then conceal the screws or other fasteners once they are driven in and tightened to arrive at the tightened position. Still further, optional pre-assembly of the door system substantially ensures the system components remain properly aligned with respect to each other during the installation. Proper alignment of the system components can minimize the potential of binding or other problems, for example, of the door opening, closing, latching, and sealing. These and other improvements to ready-to-install building assemblies are described herein. In yet further embodiments, typical sag that can occur at a latch side opposite a hinge side of a door, window, or other building panel can be addressed with anti-sag hinges configured to compensate for the weight of a panel on its hinges.

Figure 2:
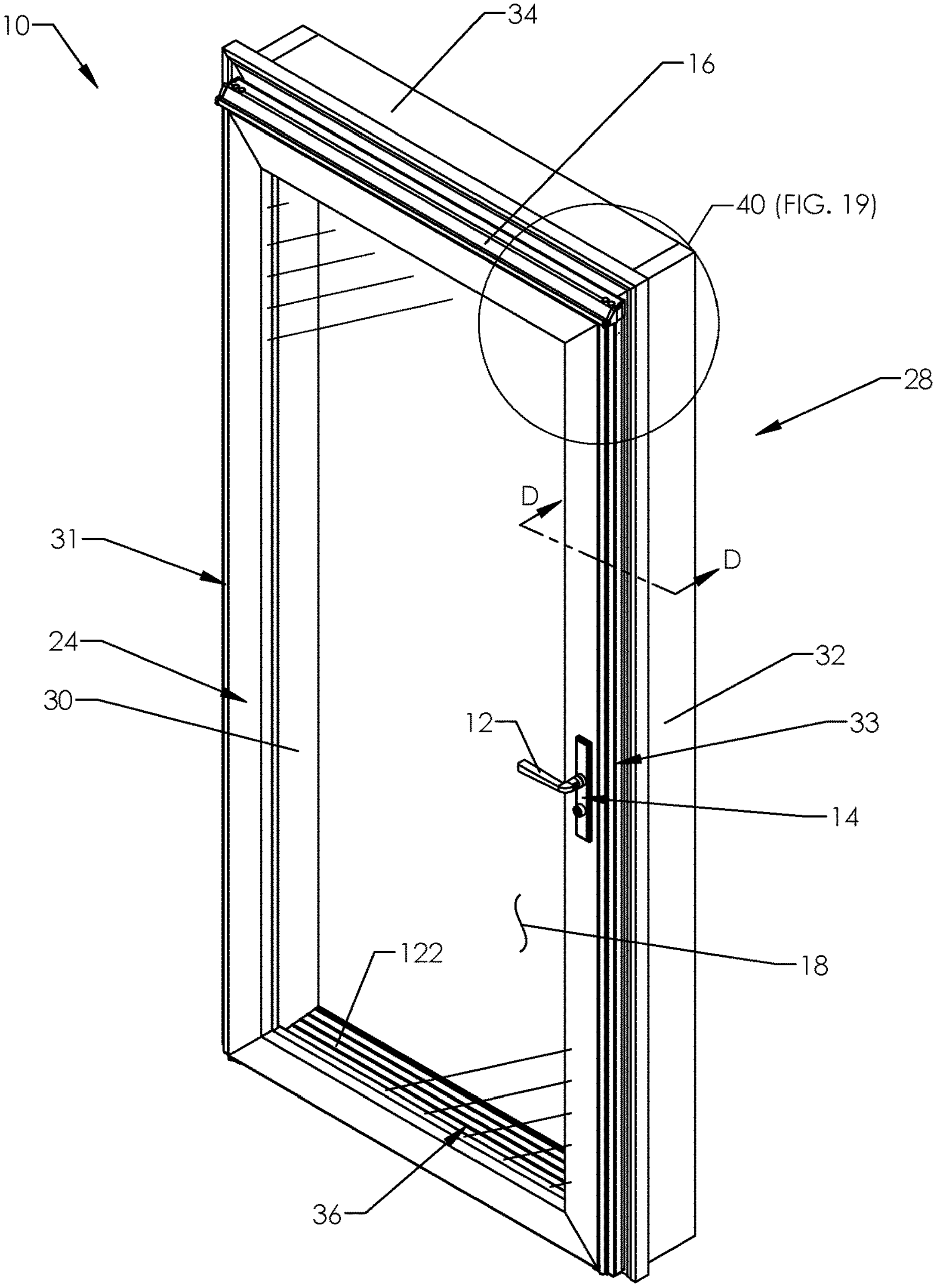
FIG. 2 is an isometric view of the example door system of FIG. 1.
Figure 3:
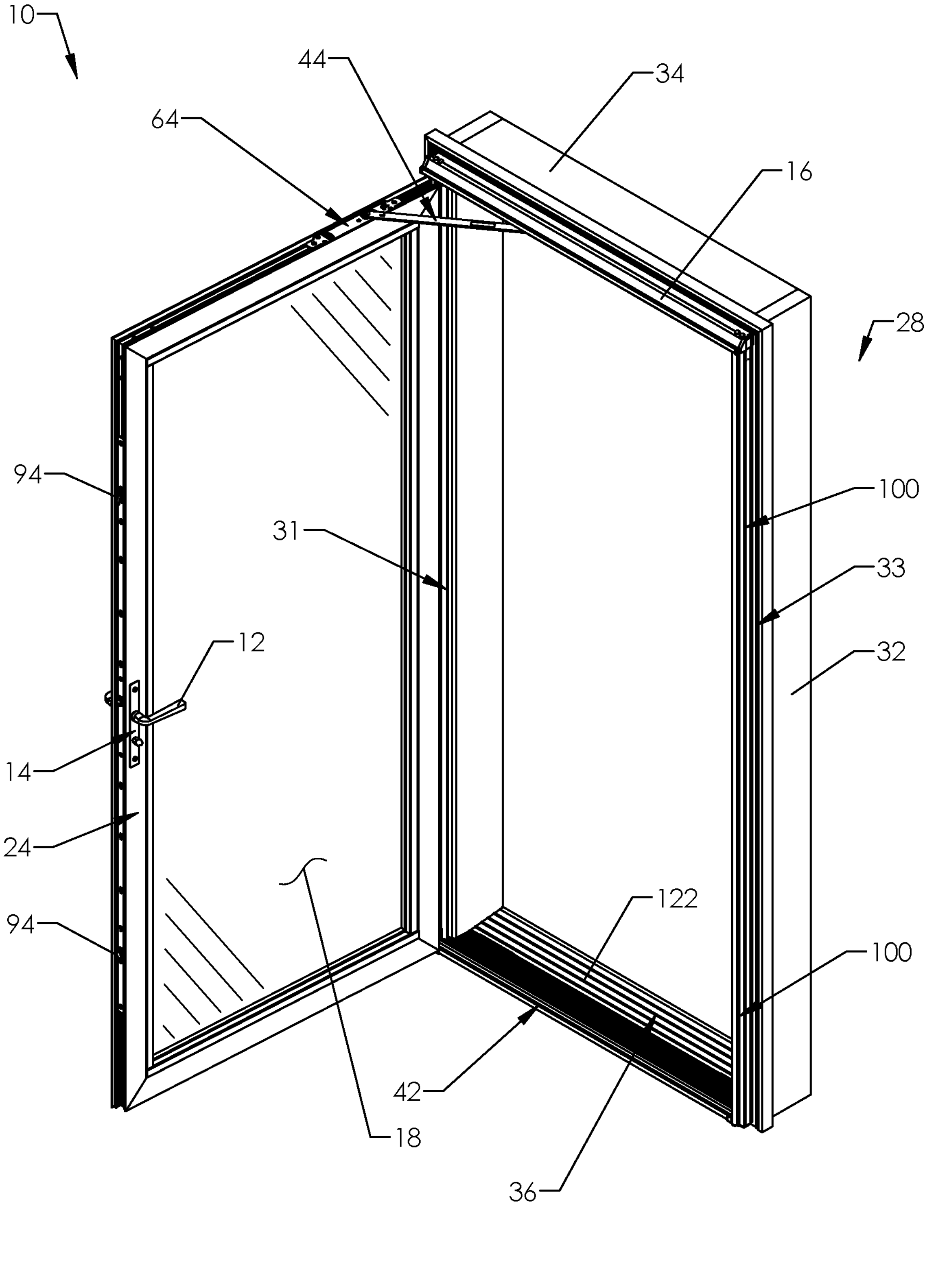
FIG. 3 is an isometric view of the example door system of FIG. 1, where a door of the door system is in a fully open (about 90°) position.

With reference now to FIGS. 1-3, one embodiment of a door system according to the present disclosure comprises a ready-to-install door assembly 10. Door assembly 10 includes a door 24, a hinge-side vertical bar 31, a latch-side vertical bar 33, a drip cap 16, an optional door closer 64 with a closer arm 44, a threshold portion 42, along with various other components. Door assembly 10 can be a ready-to-install door assembly (e.g., a system) that can be installed to or next to a door frame assembly 28, e.g., corresponding to a primary door.

The door frame assembly 28 includes a head portion of frame 34, a right jamb 32, a left jamb 30, and a lower portion of the frame 36. The door frame assembly 28 can correspond to a primary door assembly in various embodiments. Drip cap 16 is positioned proximate the head portion 34. The door 24 is pivotably attached to the hinge-side vertical bar 31 by hinge assemblies attached to the door 24. The door closer 64 can be attached to the door 24 and the drip cap 16 or the door 24 and the hinge-side vertical bar 31, according to various embodiments. In some embodiments, the drip cap 16 is attached to a top portion of the latch-side vertical bar 33, to a top portion of the hinge-side vertical bar 31, and to the door closer 64 with a closer arm 44.

The illustrated door 24 includes a panel 18, which may be transparent, for example. However, the door 24 can also be selected from the group consisting of: a storm door, a screen door, a security screen door, a configurable door with an interchangeable portion, a security door with bars, and a security door with laminated glass. According to various embodiments, the interchangeable portion of the configurable door is selected from the group consisting of: full view glass, partial-view glass, full screen, partial screen, laminated glass, security bars, and a combination of glass and screen. The door 24 can be a residential door, a light commercial door, or a heavy commercial door, among other types of doors.

As shown, the door 24 includes a lockset 14 and a handle 12. The handle 12 can actuate a latch feature of the lockset 14, and can optionally actuate a "three-point lock" hook-and-pocket securement via hooks 94 and pockets 100. See FIGS. 9-11B and related description for additional door latch detail. As shown, the handle 12 is a lever-style handle, but a door knob or any other type of handle or mechanism can optionally be substituted in place of the illustrated lever-style handle 12.

Drip cap 16 is attached to the head portion 34 of the door assembly 10. The drip cap 16 can include a drip channel 17 that is configured to operate as a gutter, in order to channel water to the sides of the door 24, thereby reducing dripping on a user when passing through the assembled and mounted door frame assembly 28.

The door 24 is pivotably attached to the hinge side 20 of the door assembly 10. The door 24 can be attached to the hinge side 20 with one or more hinges (see FIGS. 22-25 and accompanying description for an exemplary hinge configuration) and optionally by door closer hardware, including a door closer 64 with a closer arm 44. The closer arm 44 can be a single-segment closer arm or a multi-segment closer arm in various embodiments. In some embodiments, closer hardware is as described in one or more of the following U.S. patent applications, which are incorporated herein by reference: Ser. Nos. 15/382,275; 15/911,639; 15/911,690; and 15/385,091.

Figure 4:
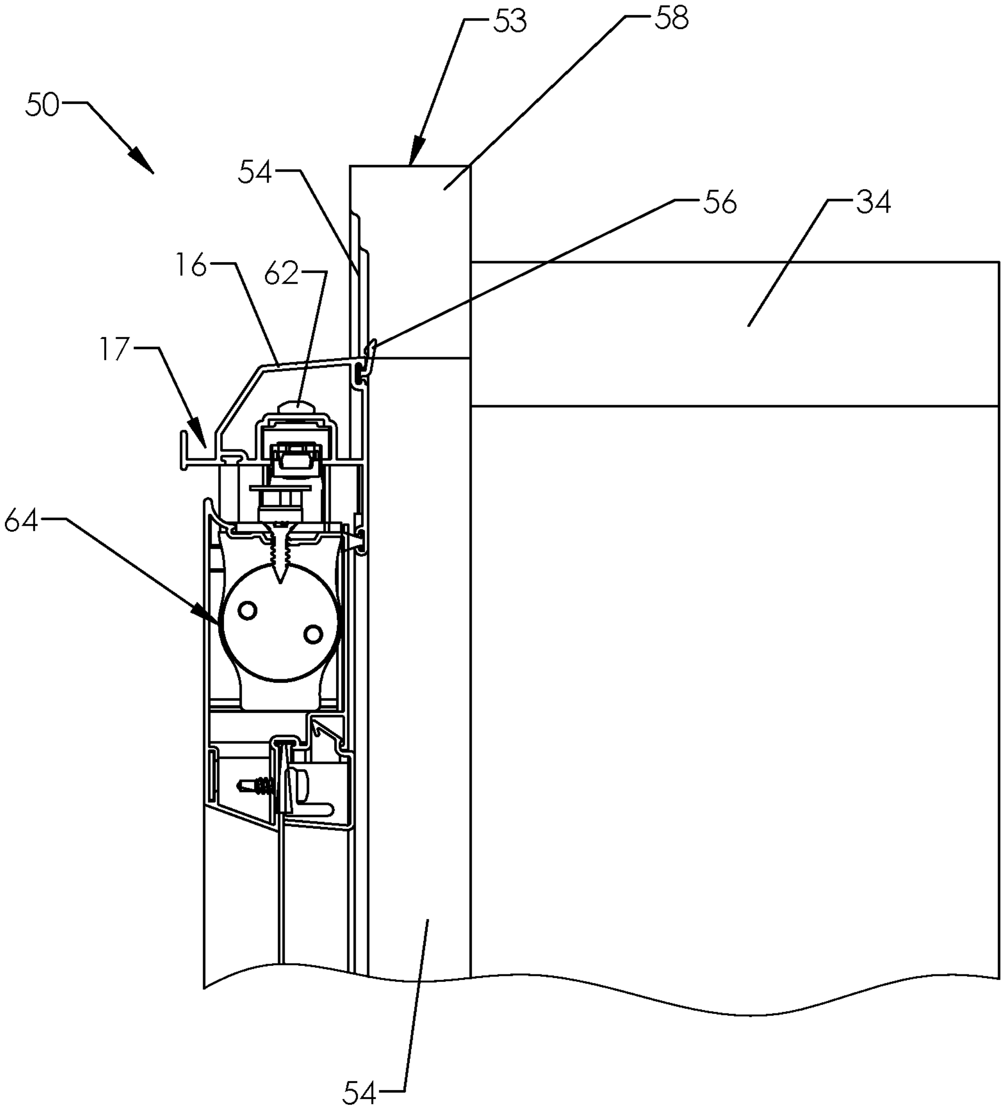
FIG. 4 is a vertical cross section view taken through a door system head and a drip cap with brickmold at a tallest condition taken along section line A-A of FIG. 1.

FIG. 4 is a vertical cross section view 50 taken through door assembly 10 head and drip cap 16 with brickmold 53 at a tallest condition, taken along section line A-A of FIG. 1. For example, FIG. 4 shows a large (tall) door opening. Brickmold 53 can include one or more brickmold portions, such as side portion 54 and upper portion 58. As shown, the side portion 54 and the upper portion 58 can be mitered at a 45-degree angle, for example, to create a brickmold mitered joint at a corner of the brickmold 53. Other embodiments may not include a mitered joint at the corner of the brickmold 53.

A brickmold seal 56 can be attached to a rear portion of the drip cap 16, and can be made of a rubber, foam, plastic, or other elastomeric material. The brickmold seal 56 can be flexible and can operate to create a versatile and preferably weather-tight seal between the drip cap 16 and the brickmold 53. Door closer 64 and a top portion of frame 34 are also shown. A fastener 62 is also shown within drip cap 16. Fastener 62 can be used to fasten the drip cap 16 to an L-shaped corner structural member (not shown).

As shown, the drip cap 16 includes a channel 17 that is configured to catch water falling on drip cap 16 and divert the water toward the latch 22 and hinge sides 24 of the door assembly 10. In preferable embodiments, the drip cap 16 has a generally downward slope (toward the face of the door assembly 10) until the slope troughs in the channel region 17. The channel 17 can be substantially level, angled to one side of the door assembly 10 or to both sides of the door assembly 10. Alternatively, other drip cap 16 arrangements can accomplish this "gutter" effect, which can substantially limit how much a user is dripped on from the drip cap 16 when passing underneath. Yet other embodiments of the drip cap 16 can omit the channel region 17 entirely.

Figure 5:
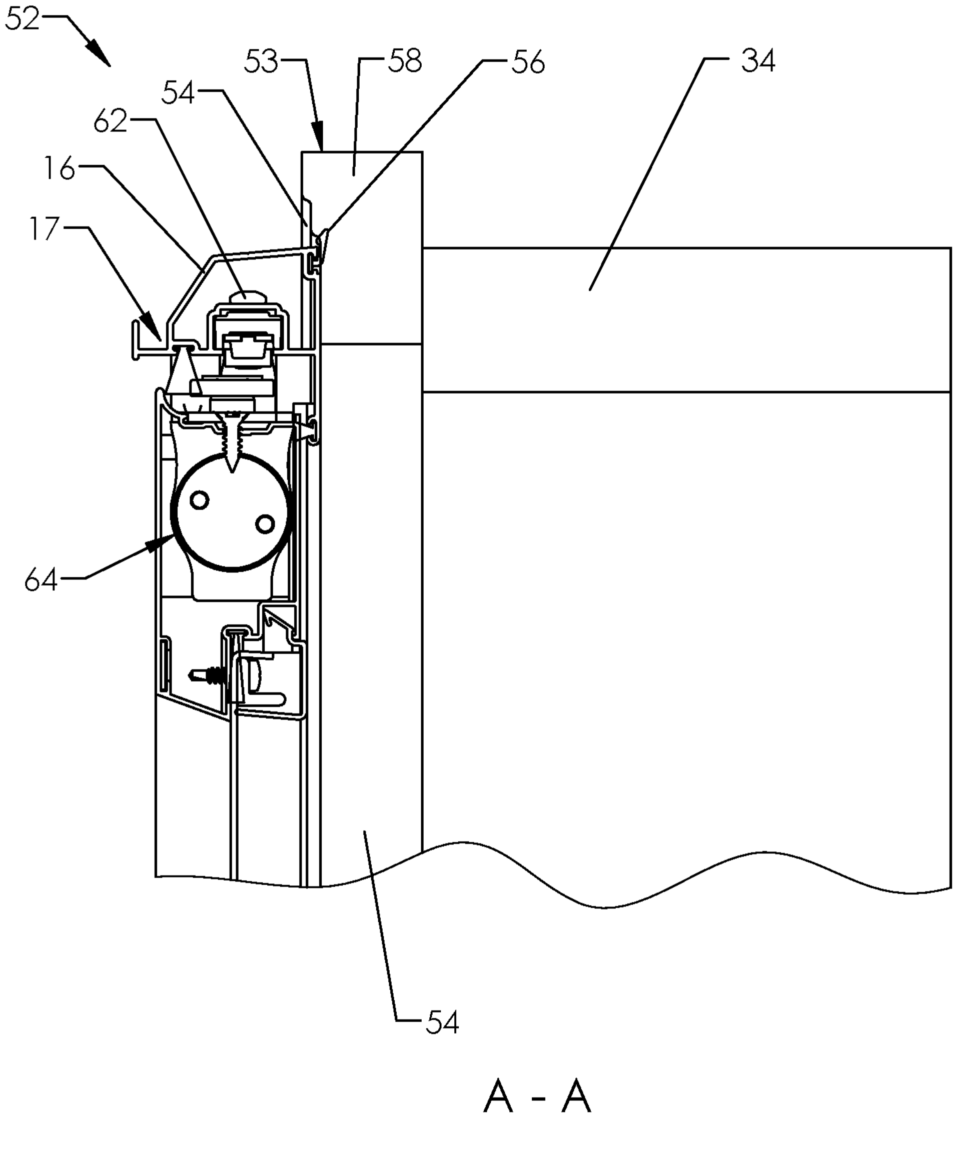
FIG. 5 is a vertical cross section view taken through a door system head and a drip cap with brickmold at a shortest condition taken along section line A-A of FIG. 1.

FIG. 5 is a vertical cross section view 52 taken through door system head and drip cap 16 with brickmold 53 at a shortest condition taken along section line A-A of FIG. 1. In other words, FIG. 5 shows a relatively small (e.g., short) brickmold 53. The brickmold 53 as shown at shortest condition 52 includes additional overlap with drip cap 16, resulting in less brickmold protrusion above the drip cap 16. Other drip cap 16 positioning is also contemplated herein, such as in locations between those shown in FIGS. 4 and 5. The drip cap 16 can be positioned in any way relative to the brickmold 53 as suitable for a particular usage case.

FIGS. 6-8A show horizontal cross section views of the latch-side vertical bar 33 taken along section line B-B of FIG. 1, with a screw 78 and a cover 76 in various positions. In exemplary embodiments, more than one screw 78 is utilized, although one screw 78 is shown for simplicity. A portion of door 24 is also shown. FIGS. 6-8A show various steps of receiving a preloaded screw 78 and tightening the screw 78 within a fastener-receiving channel 84 wide enough to clear a screw head 80 of the screw 78, where the preloaded screw 78 has a tip 88 and threads 82. Although a hinged screw cover 76 (which will be described below in further detail) with a snap closure feature 81 and a hinge feature 77 are shown in various embodiments, the cover 76 can be omitted entirely, or be a fully-removable cover without a hinge feature 77. As shown, a brickmold 53 can be positioned to receive the tip 88 of the screw 78 when the screw 78 has been tightened.

It is noted that while the description of fastening devices and structures herein generally refers to screws and their engagement with a screw plate or other threaded structure, it is understood that other fasteners are contemplated and considered to be within the scope of the description. Further, the location in which the fasteners are positioned relative to any vertical bars and/or other door frame structures may be different from that shown and described, but are understood to be applicable to the structures and methods of the disclosure.

Figure 6:
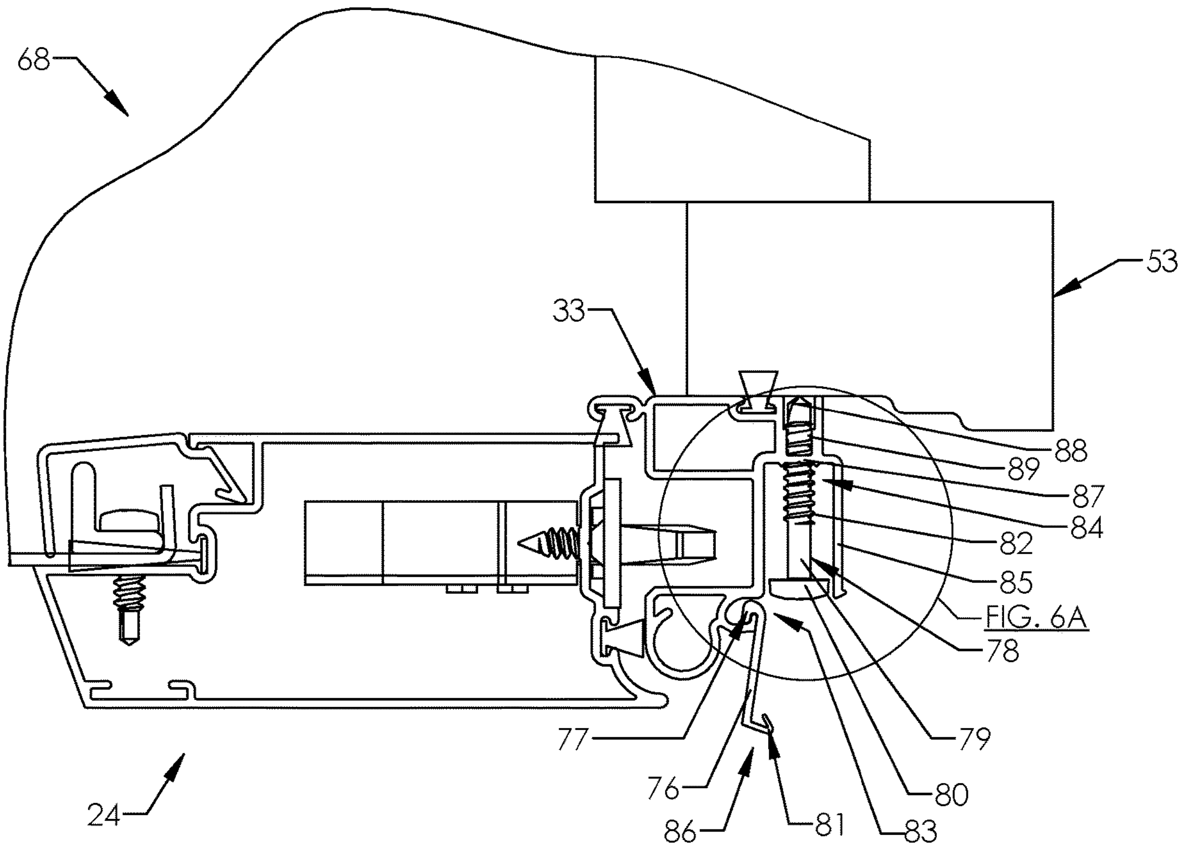
FIG. 6 is a horizontal cross section view of a latch-side vertical bar taken along section line B-B of FIG. 1 with a screw in its initial position and a screw cover in its open position.

FIG. 6 is a horizontal cross section view 68 of the latch-side vertical bar 33 taken along section line B-B of FIG. 1 with screw 78 in initial position and screw cover 76 open. In the position shown at view 68, the screw 78 is partially installed or "preloaded" by threading the screw 78 a number of rotations through a screw plate 87. Screw plate 87 can be predrilled prior to receiving the screw 78, or the screw tip 88 can be configured to be self-drilling or "self-tapping" in order to penetrate screw plate 87 without needing a separate drill apparatus or drilling step prior to the insertion of the screw 78.

Figure 6A:
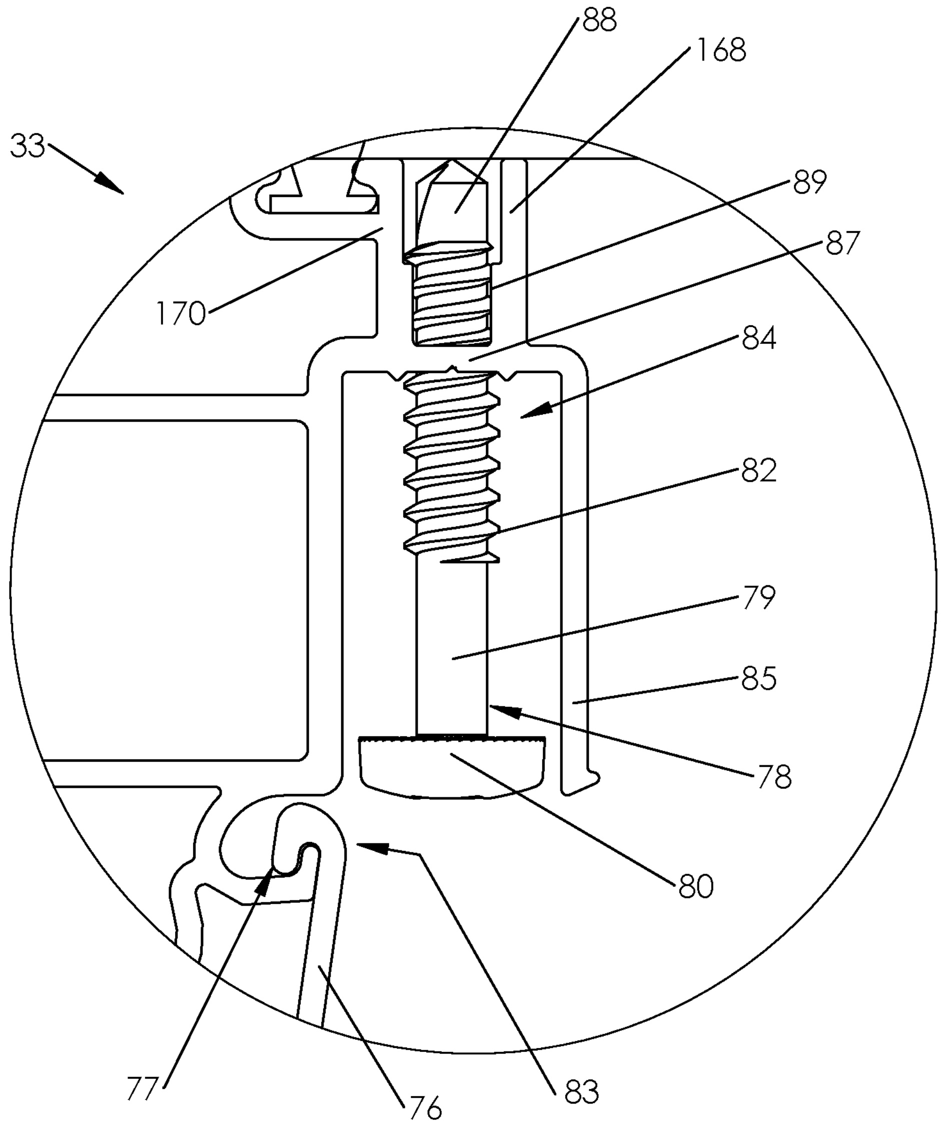
FIG. 6A shows an enlarged view of the screw in the untightened position and related parts of FIG. 6.

FIG. 6A shows an enlarged view of the screw 78 in the untightened position and related parts of FIG. 6. In particular, a screw channel 89 and a vertical mounting frame portion 85 portion of the door assembly 10 are shown in greater detail. The screw 78 has a screw shaft 79 having a minor diameter that can be less than a narrow screw channel 89 width or diameter. The threads 82 of the screw can have a major diameter that is larger than the width of the narrow screw channel 89 in order to give stability to the screw 78 when at least partially penetrated and preloaded into the narrow screw channel 79 without unduly making insertion difficult. The threads 82 can also have a minor diameter equal the shaft 79 diameter. The screw channel 89 can have opposing walls 168, 170 with opposing faces such that a distance between opposing faces is greater than the minor diameter of the threads 82. In some embodiments, the distance between opposing faces of walls 168, 170 is less than the major diameter of the threads 82. In further embodiments, and as shown, at least a portion of the opposing walls 168, 170 is separated by a distance that is greater than the major diameter.

The screw 78 can be rotated and threaded into a tightened position when the door assembly 10 is being installed as described herein. Once the screw 78 is tightened, only the screw head 80 may remain visible within the wider fastener-receiving channel 84. However, in cases where it is desirable to conceal the screw head 80 from view, a screw or fastener cover 76 can be provided for concealing an exposed or visible portion of the screw head 80, as is described below. Such a fastener cover 76 can be referred to as an "integrated fastener cover" or "integrated screw cover" in that it is permanently or semi-permanently connected to a portion of one of the frame members and moveable between an open position and a closed position without being detached from the structure to which it is mounted. As such, the convenience to the user is increased since proper placement is ensured and since there will not be a need to locate loose screw covers that can become lost or otherwise separated from the assembly during installation thereof.

Figure 7:
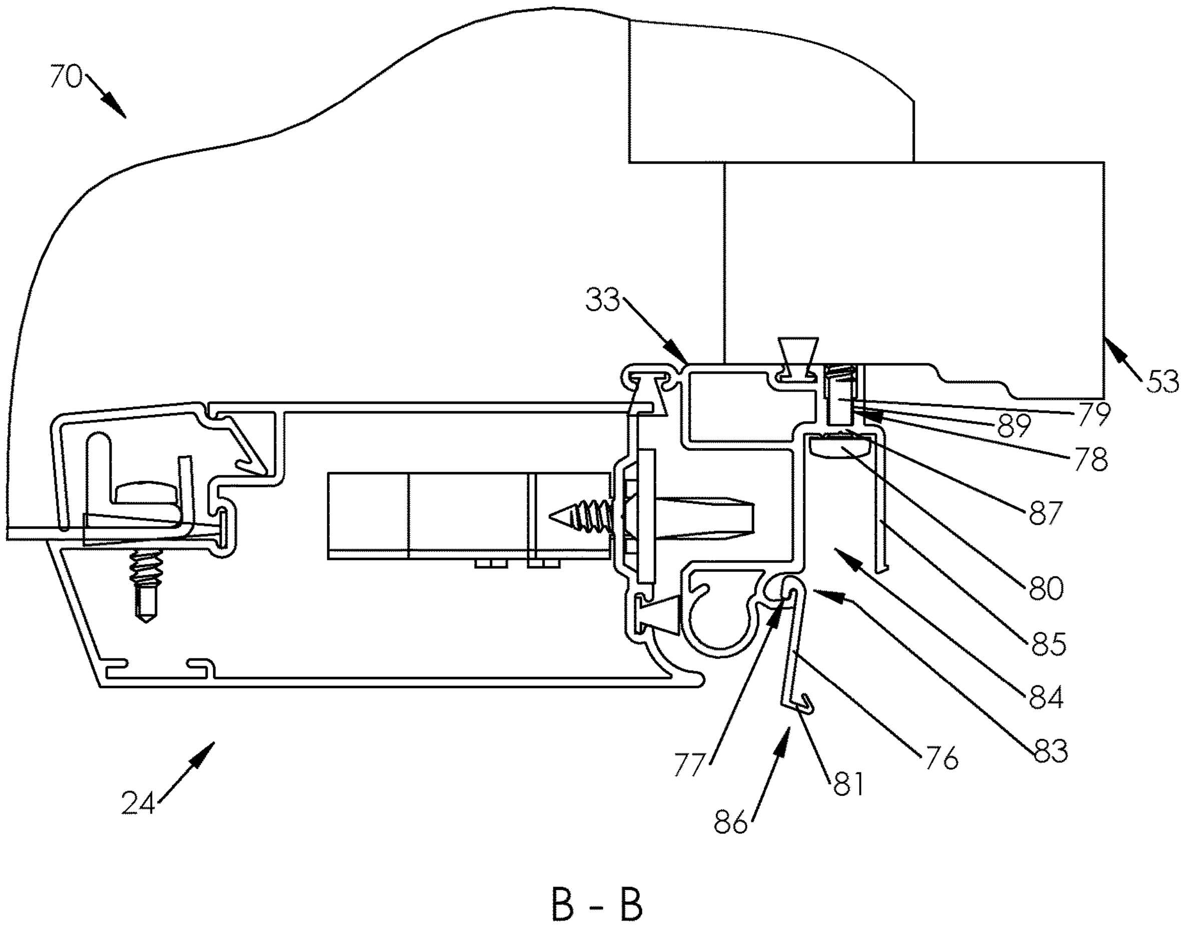
FIG. 7 is a horizontal cross section view of a latch-side vertical bar taken along section line B-B of FIG. 1 with a screw in its tightened position and a screw cover in its open position.
Figure 8:
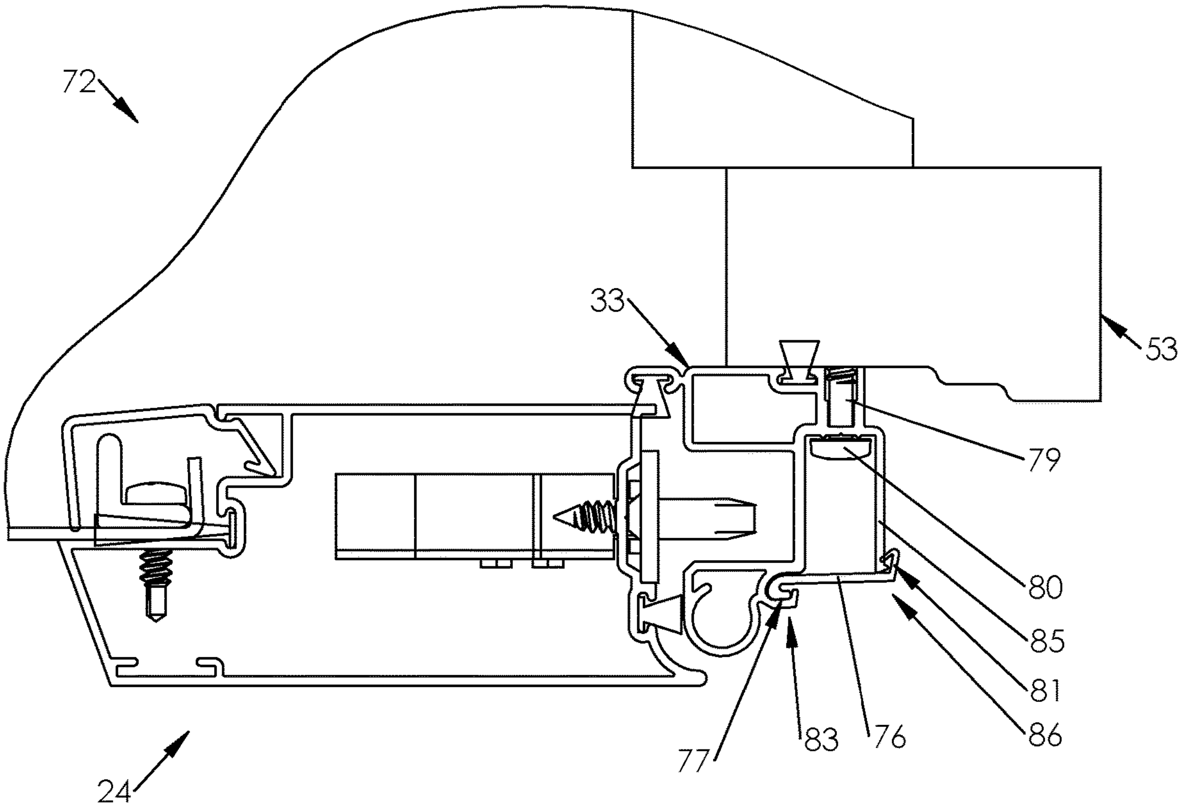
FIG. 8 is a horizontal cross section view of a latch-side vertical bar taken along section line B-B of FIG. 1 with a screw in its tightened position and a screw cover in its closed position.

FIG. 7 is a horizontal cross section view 70 of the latch-side vertical bar 33 taken along section line B-B of FIG. 1 with screw 78 driven into the tightened position and screw cover 76 in open position. FIG. 8 is a horizontal cross section view 72 of a latch-side vertical bar 33 taken along section line B-B of FIG. 1 with screw 78 in the tightened position and screw cover 76 in closed position. As shown, the screw cover 76 is connected to one of the frame members at its first end 83 in a hinged or rotatable configuration (e.g., at hinged feature 77). An opposite or second end 86 of the screw cover 76 includes the snap closure feature 81 that interfaces with a structure to which it can connect, such as one side of the fastener-receiving channel 84 or a side of an aperture (described below).

Figure 8A:
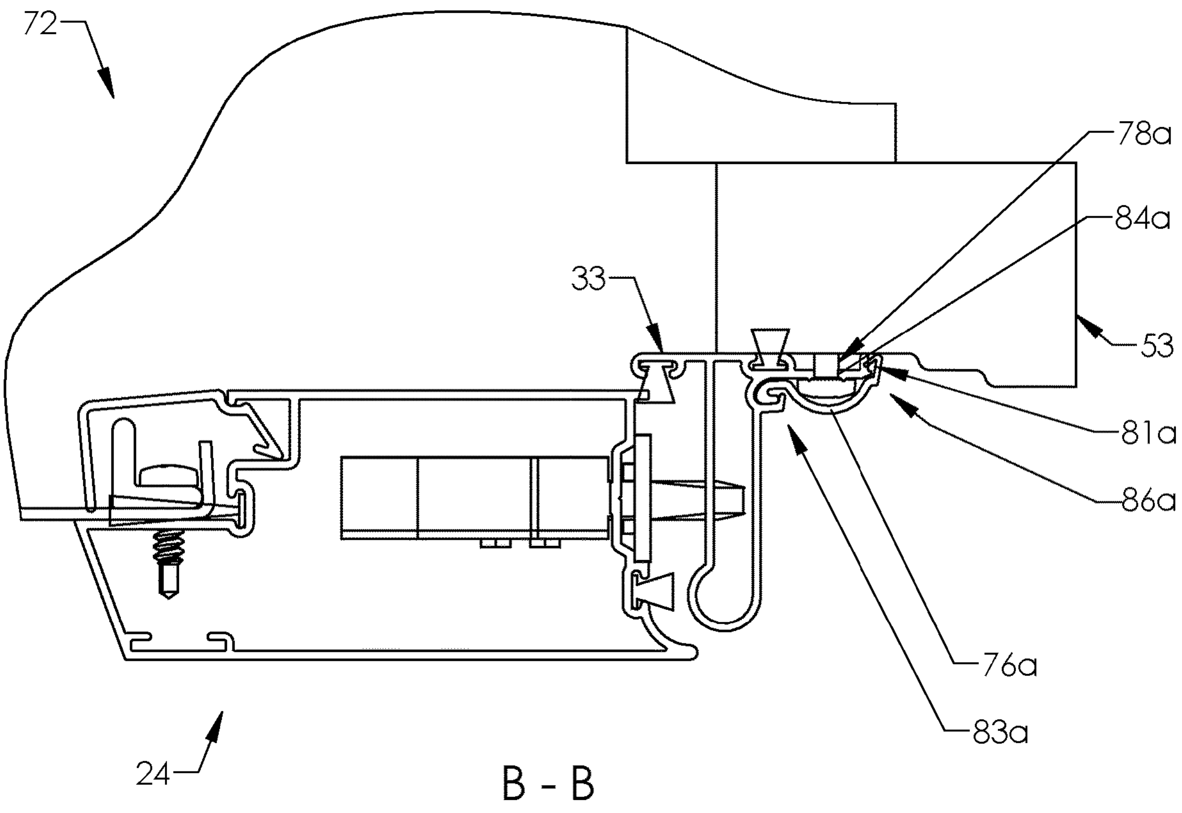
FIG. 8A is a cross section view of another embodiment of a latch-side vertical bar with a screw in its tightened position and a screw cover in its closed position.

FIG. 8A is a cross section view of another embodiment of a latch-side vertical bar with a screw or fastener 78*a* positioned in an aperture 84*a*, which may be provided in the latch-side vertical bar or may be created during the installation process. In this embodiment, a fastener cover 76*a* is connected to one of the frame members at its first end 83*a* in a hinged or rotatable configuration, with a snap closure or other type of closure feature 81*a* at its second end 86*a*. The portion of the fastener cover 76*a* between its first and second ends 83*a*, 86*a* can optionally be curved at least slightly to cover an extending head or end of the fastener 78*a*. In cases where an aperture is not pre-formed in the vertical bar, the fastener cover 76*a* may be provided adjacent to an area where the aperture will be created during installation. In general, the fastener-receiving portions described herein can include fastener-receiving channels, apertures, or other structures or areas that can accept a fastener for securing the system to a building opening.

Although the fastener covers described above include a snap closure feature at one end for "snapping" the covers closed relative to another structure, it is understood that an actual "snap" is not required and that any type of positive engagement can be used, such as adhesives, hook-and-loop features, detents, clips, and the like. Once the connection of the fastener cover is made, it may be considered to be either permanent or semi-permanent such that it can be released at a later time to expose the fastener, if desired, or for replacement of the cover. In addition, the hinge features shown for the hinged or rotatable connection of the fastener covers can have a different configuration than shown and described.

Figure 9:
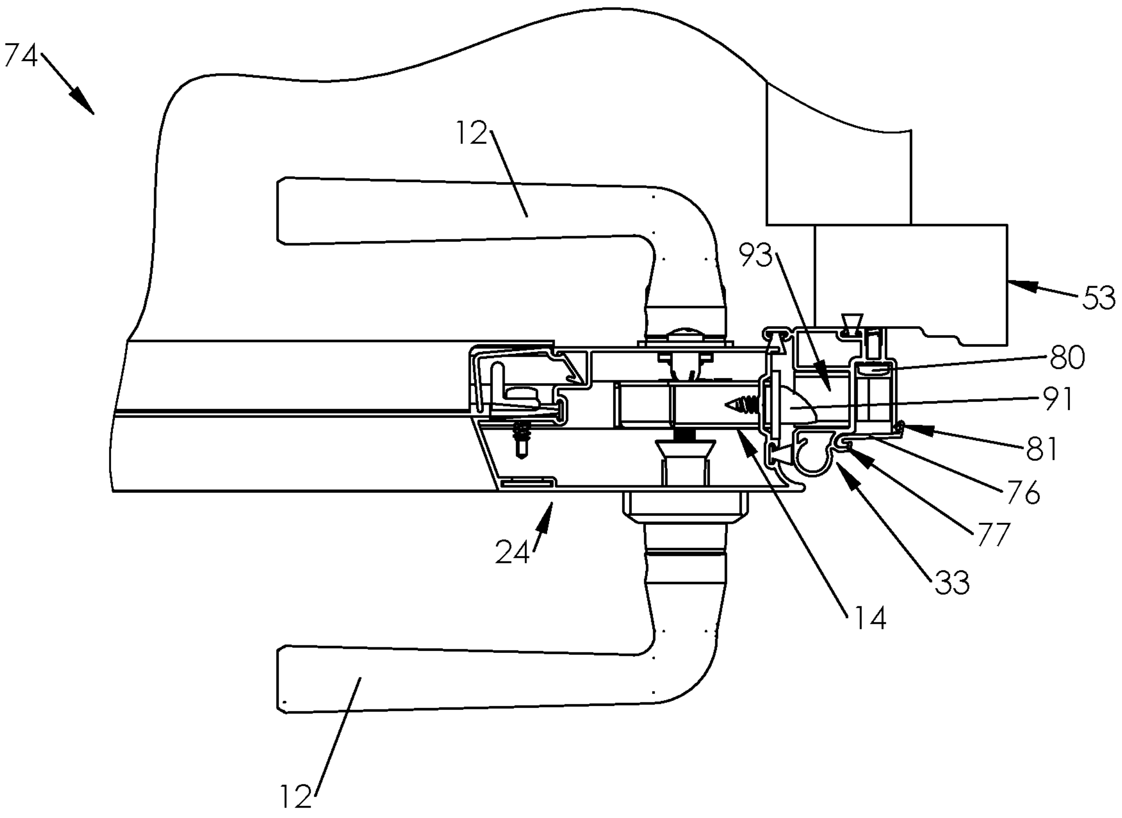
FIG. 9 is a horizontal cross section view of a latch-side vertical bar taken along section line C-C of FIG. 1 with a screw in its tightened position and a screw cover in its closed position, also showing a latch nose bolt in a vertical strike channel.

FIG. 9 is a horizontal cross section view 74 of a latch-side vertical bar taken along section line C-C of FIG. 1 with screw 78 in the tightened position and screw cover 76 in closed position, also showing a nose (latch) bolt 91 in a vertical strike channel 93. The vertical strike channel 93 can be elongated and can extend substantially an entire height of the latch side 22 of the door assembly 10. As shown, there are two handles 12 connected to the lockset 14 within the door 24. The nose bolt 91 can be configured to be actuated as a part of the lockset 14, and turning or pulling a handle 12 can release the nose bolt 91 when the lockset 14 is in an unlocked state, or if a user is attempting to open the door 24 from the inside. Other features shown in FIG. 9 are described with respect to FIGS. 6-8 and accompanying description, herein.

Figure 10A:
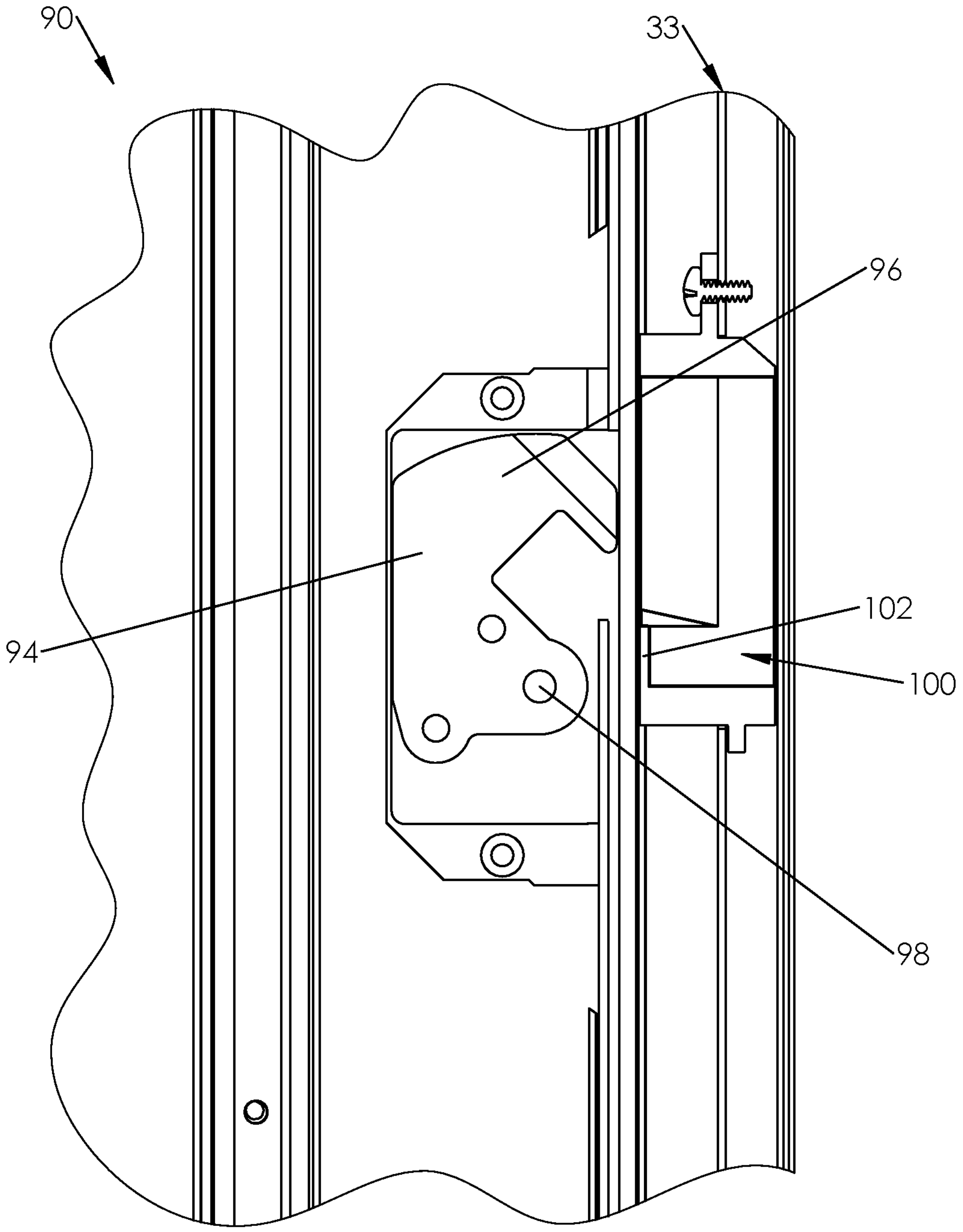
FIG. 10A is a cross section view of a three-point securement hook and recessed jamb pocket in a disengaged (unlocked) position taken along section line D-D of FIG. 2.
Figure 10B:
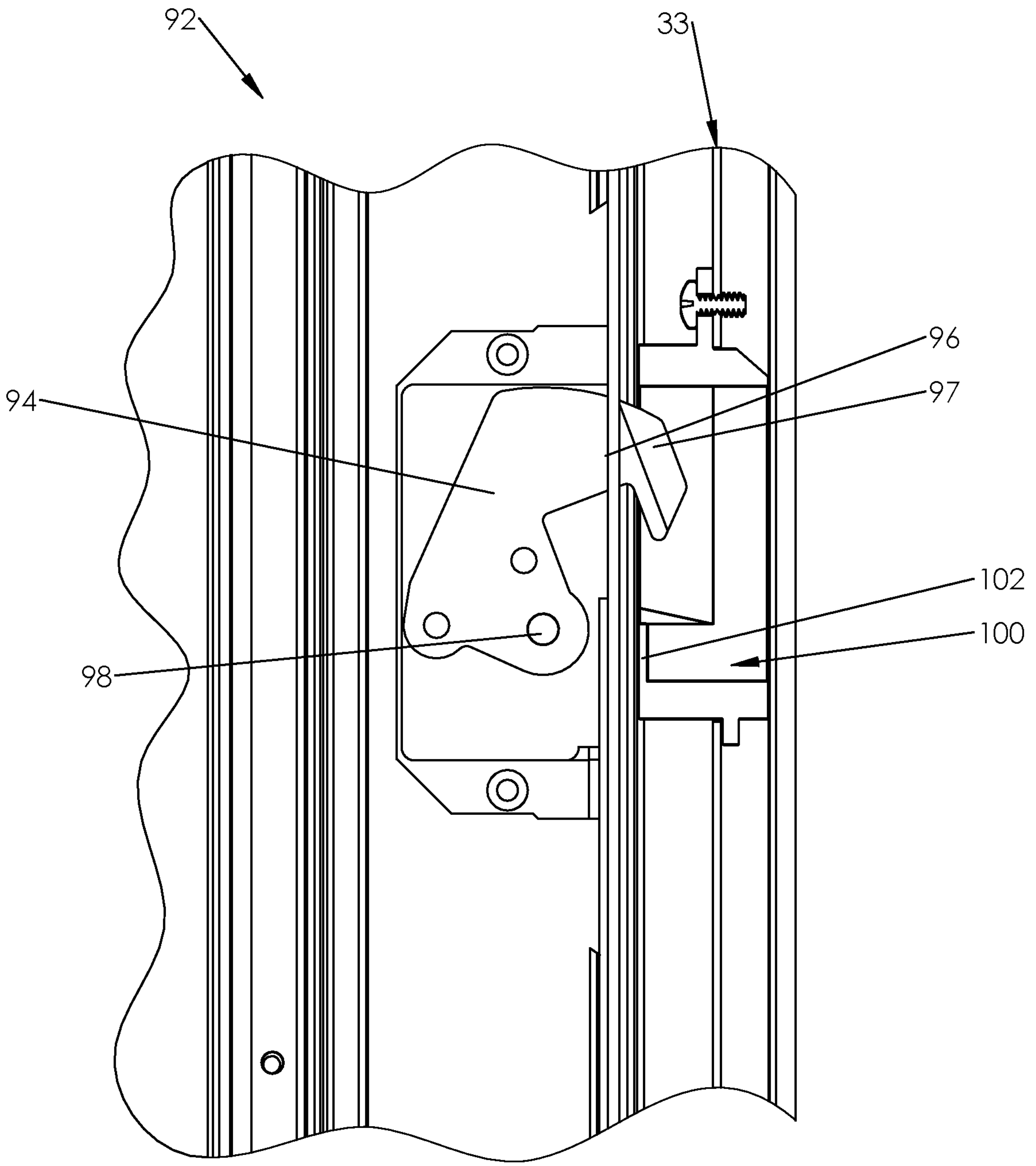
FIG. 10B is a cross section view of the three-point securement hook and recessed jamb pocket of FIG. 10A, in an engaged (locked) position and taken along section line D-D of FIG. 2.

FIGS. 10A and 10B show cross section views of a securement hook 94 and recessed jamb pocket 100. FIG. 10A is a cross section view 90 of a securement hook 94 and recessed jamb pocket 100 in a disengaged position taken along section line D-D of FIG. 1, and FIG. 10B is a cross section view 92 of the securement hook 94 and recessed jamb pocket 100 of FIG. 10A, in an engaged position and taken along section line D-D of FIG. 1.

The securement hook 94 can be a "three-point" lock hook according to various embodiments. In some embodiments, a three-point securement hook 94 can be engaged by a user pulling up on a door's handle, such as handle 12. During typical operation, the handle 12 can be pulled down instead, which releases the latch and nose bolt 91. The securement hook 94 can include a tip portion 96 and can include one or more ramped features 97 on or near the tip 96 to facilitate alignment of securement hook 94 with jamb pocket 100 and smooth operation. A pivot point 98 (e.g., about a pivot pin) can provide a rotational axis for the securement hook 94. The recessed jamb pocket 100 can be sized and shaped to receive the hook 94 as it is rotated into a locked or engaged position (FIG. 10B) from an unlocked or disengaged position (FIG. 10A). As shown with respect to FIG. 3, two or more hook 94 and pocket 100 combinations can be included in embodiments of the door assembly 10. When two securement hooks 94 are used, they combine with nose bolt 91 to form the "three point" lock.

As an optional feature, the pocket 100 can also include a surface 102 that is configured to interface with the tip 96 of the hook 94 such that the door 24 has increase security if an attempt is made to open a latched and/or locked door 24. In certain embodiments, if door 24 is latched, the hook tip 96 can interface with the surface 102 when the hook 94 and tip 96 are pulled from the pocket 100. As the hook 94 is pulled to the side without handle 12 or latch operation, the tip 96 can contact the angled surface 102, restricting further movement. The surface 102 and the hook 94 may not be depicted to scale.

Figure 11A:
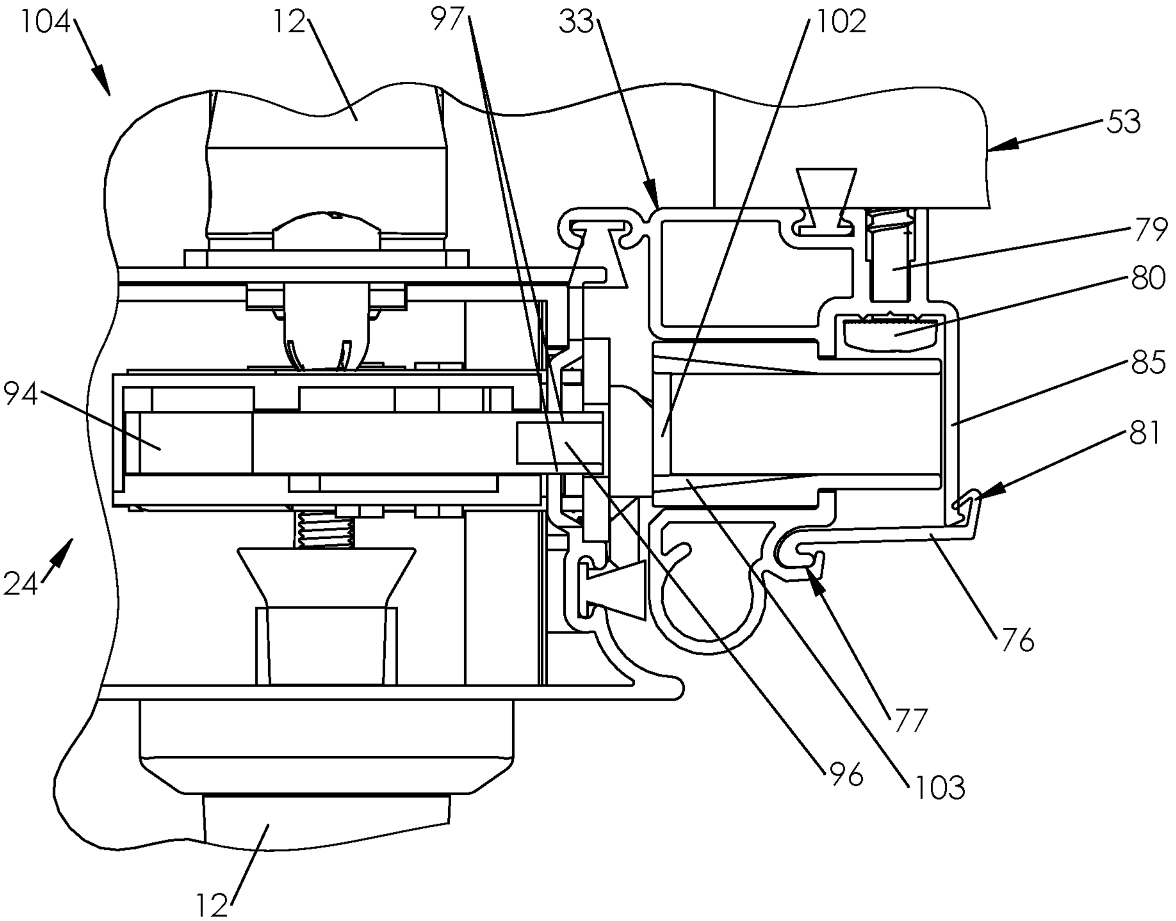
FIG. 11A is a cross section view of a door, mounting frame, and jamb that shows the three-point securement hook and recessed jamb pocket in a disengaged (unlocked) position taken along section line E-E of FIG. 1.
Figure 11B:
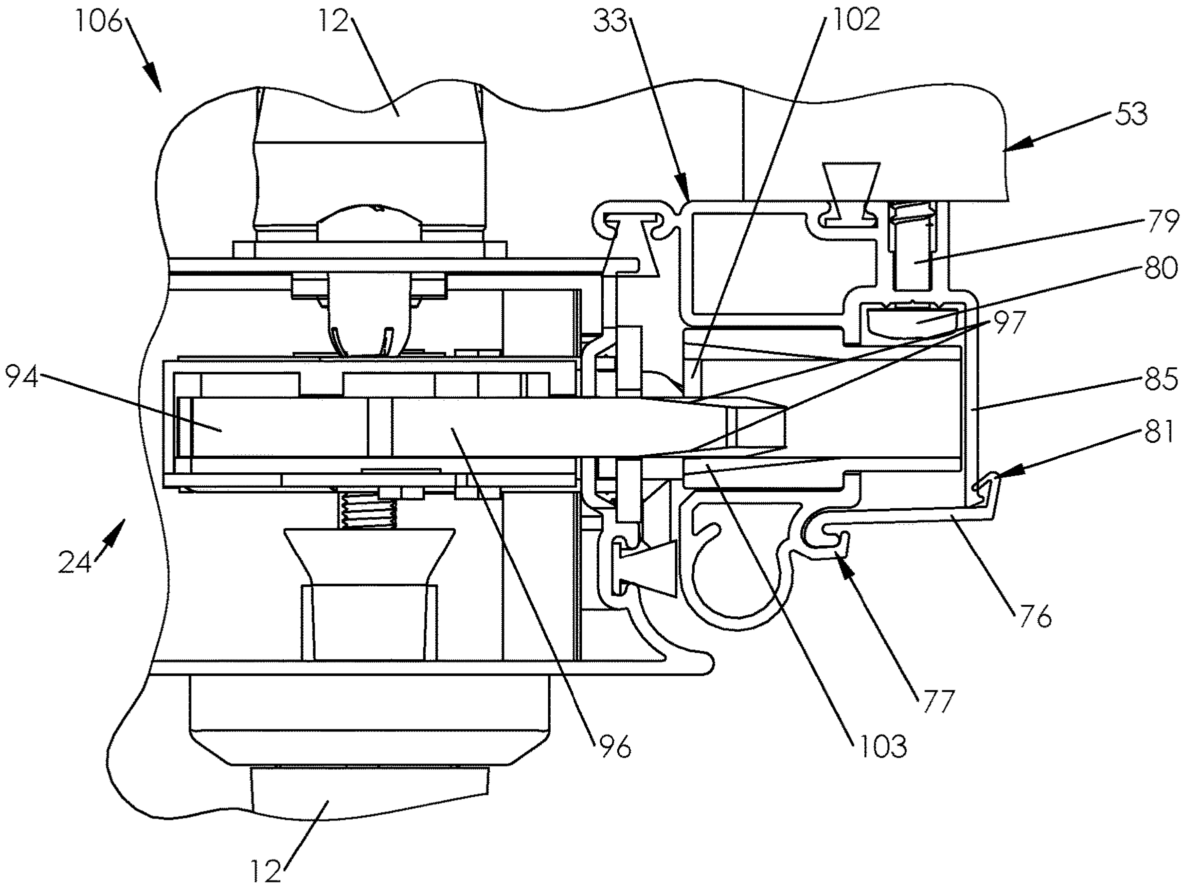
FIG. 11B is a cross section view of a door, mounting frame, and jamb that shows the three-point securement hook and recessed jamb pocket in an engaged (locked) position taken along section line E-E of FIG. 1.

FIGS. 11A and 11B are cross section views taken along section line E-E of FIG. 1 of a door, mounting frame, and jamb that shows the securement hook 94 approaching the recessed jamb pocket 100 and engaged with the recessed jamb pocket 100 that shows ramped surfaces 97 on sides of hook 94 and shows the inside of the recessed jamb pocket 100 and how angled surface 103 secures the door 24 (and/or pushes the door 24 shut) when securement hook 94 is extended. In particular, FIG. 11A at 104 shows the securement hook 94 in the unlocked (disengaged) position, and corresponds to FIG. 10A. FIG. 11B at 106 shows the securement hook 94 in the locked (engaged) position, and corresponds to FIG. 10B.

Figure 12:
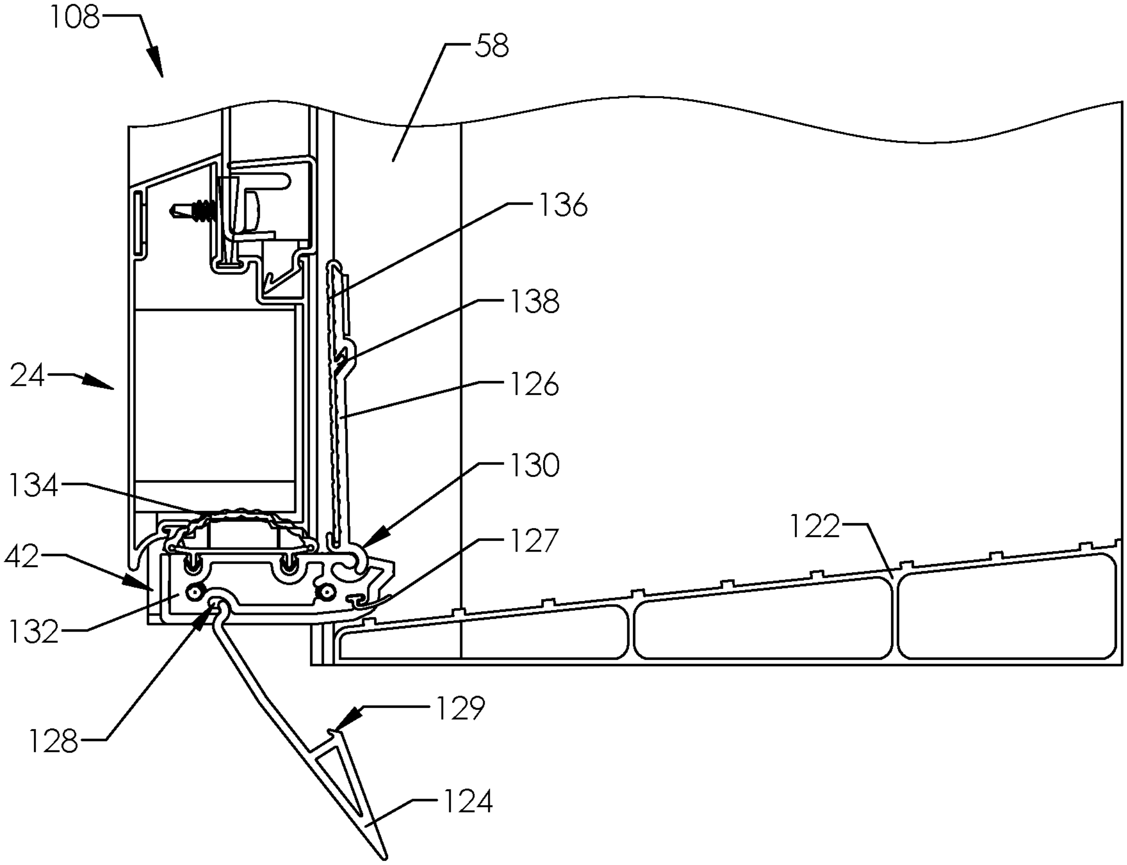
FIG. 12 is a vertical cross section view of a primary door sill with a door assembly support ready to be inserted into a threshold portion and a sill transition in a vertical position, taken along section line F-F of FIG. 1.
Figure 13:
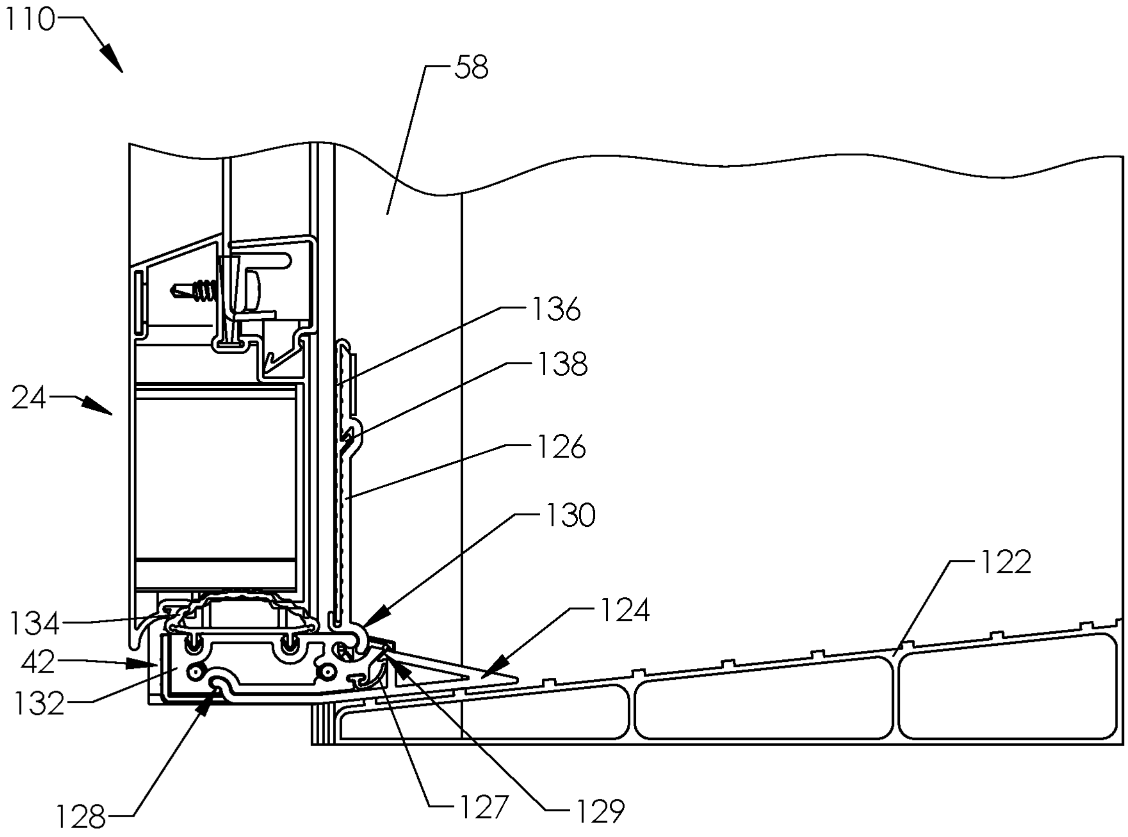
FIG. 13 is a vertical cross section view of the primary door sill of FIG. 12 with the door assembly support inserted and rotated in place and resting on the primary door sill and the sill transition in a vertical position.
Figure 14:
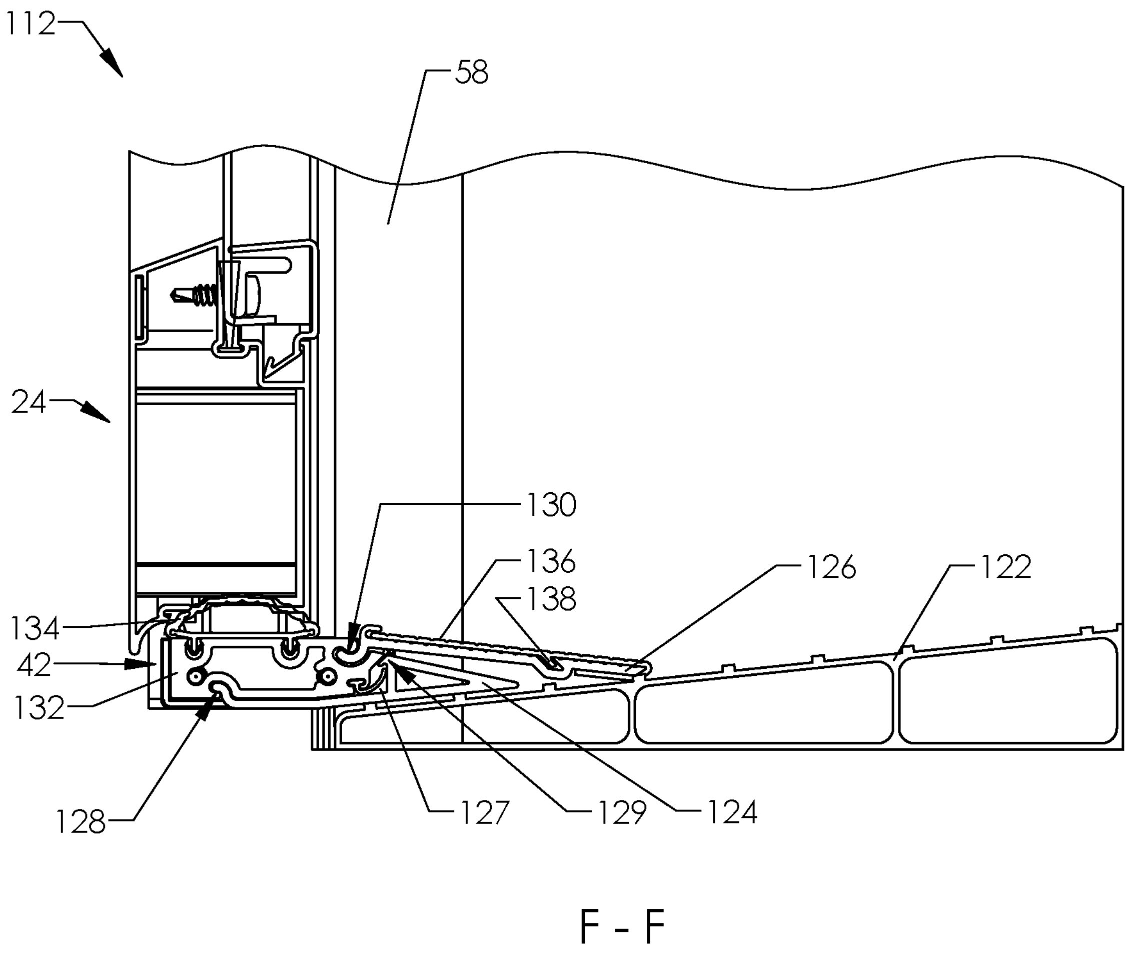
FIG. 14 is a vertical cross section view of the primary door sill of FIG. 12 with the door assembly support inserted and snapped in place and resting on the primary door sill and the sill transition in a lowered position and contacting the primary door sill.

Turning now to FIGS. 12-14 in particular, a series of vertical cross section views are shown of a primary door sill 122 with one or more door assembly supports 124 in various positions relative to a sill frame 132 and a sill transition 126. When an installer receives a door assembly 10 for installation, one or more steps can remain in some embodiments to prepare and install the door assembly 10 to a primary door frame (e.g., one or more portion of frame assembly 28), which can include a primary door sill 122. In particular, primary door sills come in various configurations, sizes, and dimensions. As shown, the primary door sill 122 is wedge-shaped, and slopes down toward a front of a primary door. Therefore, the door assembly 10 would typically be installed nearest the lowest point in the slope of the primary door sill 122. A trend in present primary doors is to reduce the overall size of the primary door sill 122 to reduce cost of manufacture and materials. Therefore, there is a need for an adaptable door assembly 10 that can adjust to different primary doors frames 60, brickmolds 53, and primary door sills 122. Some examples of primary door sills 122 may not extend underneath the door assembly 28, and therefore would not provide direct support to the door assembly 10. The door assembly 10 (when shipped) can be provided with one or more door assembly supports 124, wherein one of such door assembly supports 124 is shown in FIGS. 12-14. In various embodiments, three door assembly supports 124 can be utilized and spaced at various points on the sill frame 132, such as at evenly-spaced intervals. In other embodiments, fewer or more door assembly supports 124 can be utilized, for example, for heavier, lighter, larger, smaller, etc. door assemblies 10 as contemplated herein. The one or more door assembly supports 124 may extend across the entire width of the sill frame 132, or may extend across only a portion thereof.

FIG. 12 is a vertical cross section view 108 of an exemplary embodiment of a primary door sill 122 with a door assembly support 124 that is ready to be inserted into a sill frame 132 and a sill transition 126 in vertical (shipping) position. The door assembly support 124 can be shipped, provided, or packaged separately and uninstalled from the door assembly 10. In some embodiments, the door assembly support 124 can be inserted into the sill frame 132 to create a pivoting hinge feature 128 that allows for a secure, but dihedral rotatable attachment of the door assembly support 124 to the sill frame 132. The hinge feature 128 of the door assembly support 124 can be configured such that the door assembly support 124 does not disengage from the sill frame 132 once rotated. The sill frame 132 and door assembly support 124 can have a complementary snap-fit feature 129 that permit a secure attachment of the door assembly support 124 to the primary door sill 132 when the door assembly support 124 is inserted into the primary door sill 132 and rotated dihedrally upward and rearward as viewed from a front side of the door assembly 10.

A flexible transition leaf 127 can be positioned below and attached to a bottom portion of the sill frame 132. When the door assembly support 124 is rotated into place, the door assembly support 124 can contact and press against the transition leaf 127. The transition leaf can be formed of a flexible and/or elastomeric material, and can operate to provide a secure, dampened fit between the sill frame 132 and the door assembly support 124. The transition leaf 127 can be compressed when the door assembly 10 is installed to assist in the installation process. In particular, as the door assembly support 124 is rotated (e.g., counterclockwise, relative to the illustrated embodiment) from a near-vertical installation position into the position illustrated, an angled portion 129 at the end of the door support assembly 124 will deflect or compress the leaf 127 at least slightly so that the door support assembly can pass by it. The leaf 127 can then "decompress" or move back toward its original configuration. In this way, the leaf 127 will prevent the door support assembly 124 from freely rotating (e.g., clockwise, relative to the illustrated embodiment) under its own weight and fall out of the sill frame 132 when while the door is being positioned on the primary door sill 122.

To illustrate the door assembly support 124 snapped in place to the sill frame 132, FIG. 13 shows a vertical cross section view 110 of the primary door sill 122 with the door assembly support 124 inserted into the sill frame 132 and snapped in place and resting on a primary door sill 122 and sill transition 126 in the vertical position. The angled portion 129 can allow for a user to install the door assembly 10 without having to also manage the positioning of the door assembly support 124, making installation more straightforward and simple. In other embodiments, the angled portion 129 can additionally or alternatively be any other form of attachment, such as adhesives, hook-and-loop features, detents, clips, and the like such that the door assembly support 124 is sufficiently held in place relative to the sill frame 132 to at least overcome the force of gravity, which would otherwise cause the door assembly support 124 to fall off or swing out of place relative to the sill frame 132.

The door assembly 10 can then be rested on the primary door sill 122 via the door assembly support 124. When resting, a user (or machine) can then drive screws 78 into a frame of the primary door, attaching the door assembly 10 to the frame or other portion of the primary door or assembly (not shown). Once at least one of the screws 78 has been tightened, and preferably all of the screws 78 have been tightened, various sill-related finished steps can optionally be performed. In particular, a sill transition 126, which can be inserted into a top portion of the sill frame 132 by a user or at a factory, can be in a vertical position when shipped or prior to installation. The vertical position of the sill transition 126 can be such that the sill transition 126 begins adjacent to door 24. As shown in FIG. 14, a vertical cross section view 112 of the primary door sill 122 with the door assembly support 124 inserted into the sill frame 132 and snapped in place and resting on primary door sill 122 and sill transition 126 in lowered position and contacting primary door sill 122 is depicted. As shown, the sill transition 126 can be rotated down via a hinge feature 130 toward and such that contact is made with the primary door sill 122. This contact can cause the sill transition to rest on the primary door sill 122 so that a user can walk seamlessly from the primary door sill 122 to the sill transition 126 to the threshold 42 of the door assembly 10 without significant encumbrance and with minimal topographical undulation. The hinge feature 130 of the sill transition 126 can be configured such that the sill transition 126 does not fall off the sill frame 132 when rotated at various angles.

To further improve the benefits of the sill transition 126, the sill transition can be provided with a sill extender 136 that can be adjustable and/or trimmed to fit the threshold 42, the primary door sill 122, the primary door frame, etc. The sill extender 136 can be provided as a single piece or multiple pieces in various embodiments. The sill extender 136 can be attached to the sill transition 126 via a sill extender attachment point 138, which can include a transverse groove that runs along a width of the sill transition 126. A snap-fit engagement can provide a secure fit of the sill extender 136 to the sill transition 126. The sill extender 136 can also be repositioned (see FIG. 16) and/or trimmed to become a trimmed sill extender 140 (see, e.g., FIGS. 17 and 18) that is custom fitted and trimmed to suit particular implementation, primary door frame 60, brickmold 53, etc.

Also shown in FIGS. 12-14 is an optional sill seal 134 that is configured to create a weather-tight seal of the door 24 with respect to the threshold 42. The sill seal 134 can be shaped as a half-moon or half ellipse, and can be substantially round at a top side. Optionally, various ridges with a wave-like shape can provide a textured surface of the sill seal 134, which can improve structural and sealing properties and/or traction when stepped on or when a door 24 slides across the sill seal 134 when being opened or closed. The sill seal 134 can be attached to the sill frame 132 using one or more flexible snap-fit connectors, and can be removable if desired, such as for replacement or service. The sill seal 134 can be at least partially hollow and can include one or more structural internal members to provide a certain degree of structural rigidity as desired to provide the weather-tight seal with respect to the door 24.

Figure 13A:
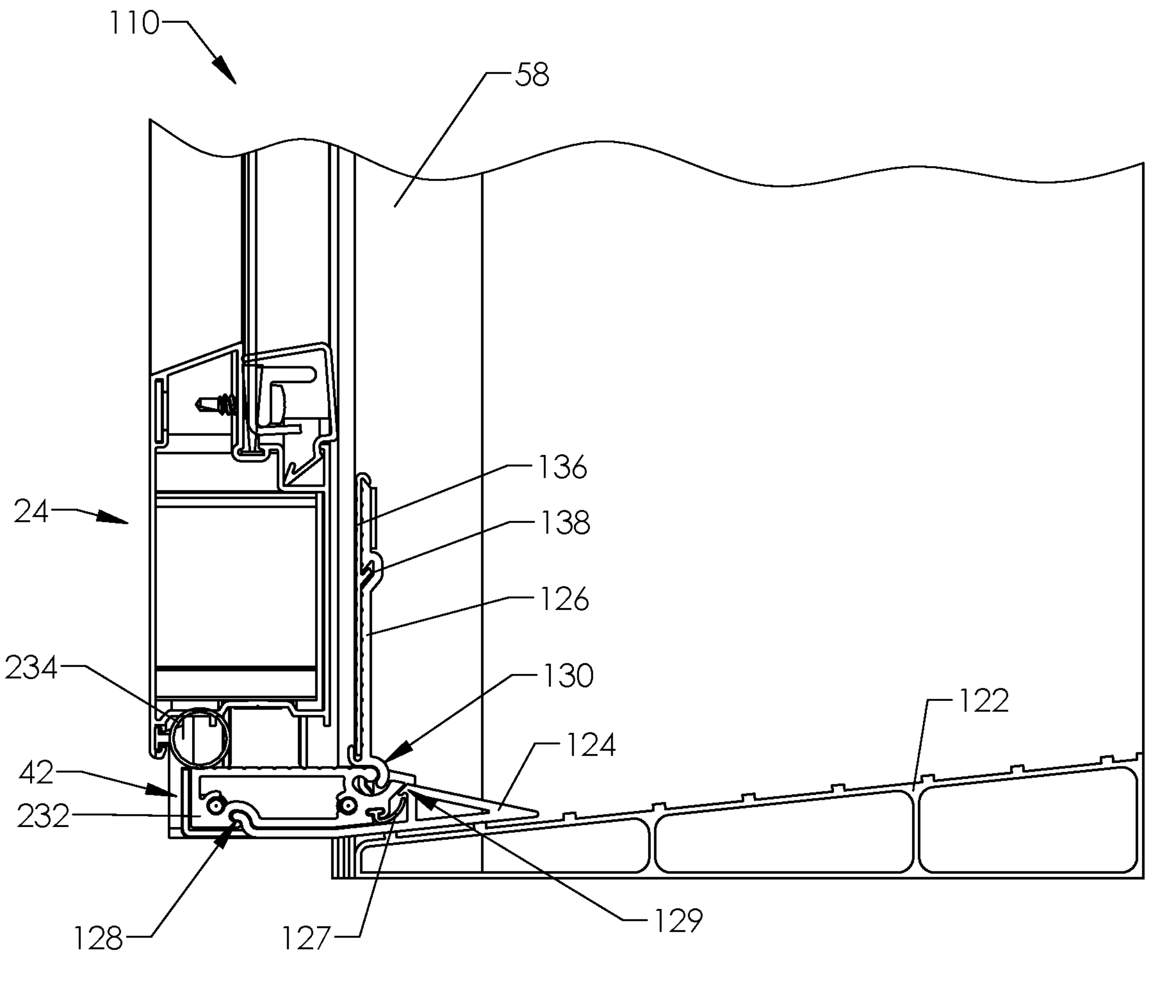
FIG. 13A is another vertical cross section view of the primary door sill of FIG. 12 with the door assembly support inserted and rotated in place and resting on the primary door sill and the sill transition in a vertical position.

FIG. 13A illustrates the primary door sill 122 with the door assembly support 124 inserted into another embodiment of a sill frame 232 and resting on a primary door sill 122 and sill transition 126 in the vertical position. This figure illustrates an alternate configuration of a sill seal 234 that is configured to create a weather tight-seal of the door 24 with respect to the threshold 42. The sill seal 234 is an elongated member that extends across at least a portion of the width of the door and is compressible to create a desired seal. The sill seal 234 is illustrated as having a circular cross section, although it is understood that it can instead have a different cross sectional shape. The sill seal 234 can be attached to the sill frame 232 using one or more connectors, and can be removable if desired, such as for replacement or service. The sill seal 234 can be at least partially hollow and can include one or more structural internal members to provide a certain degree of structural rigidity as desired to provide the weather-tight seal with respect to the door 24.

Figure 15:
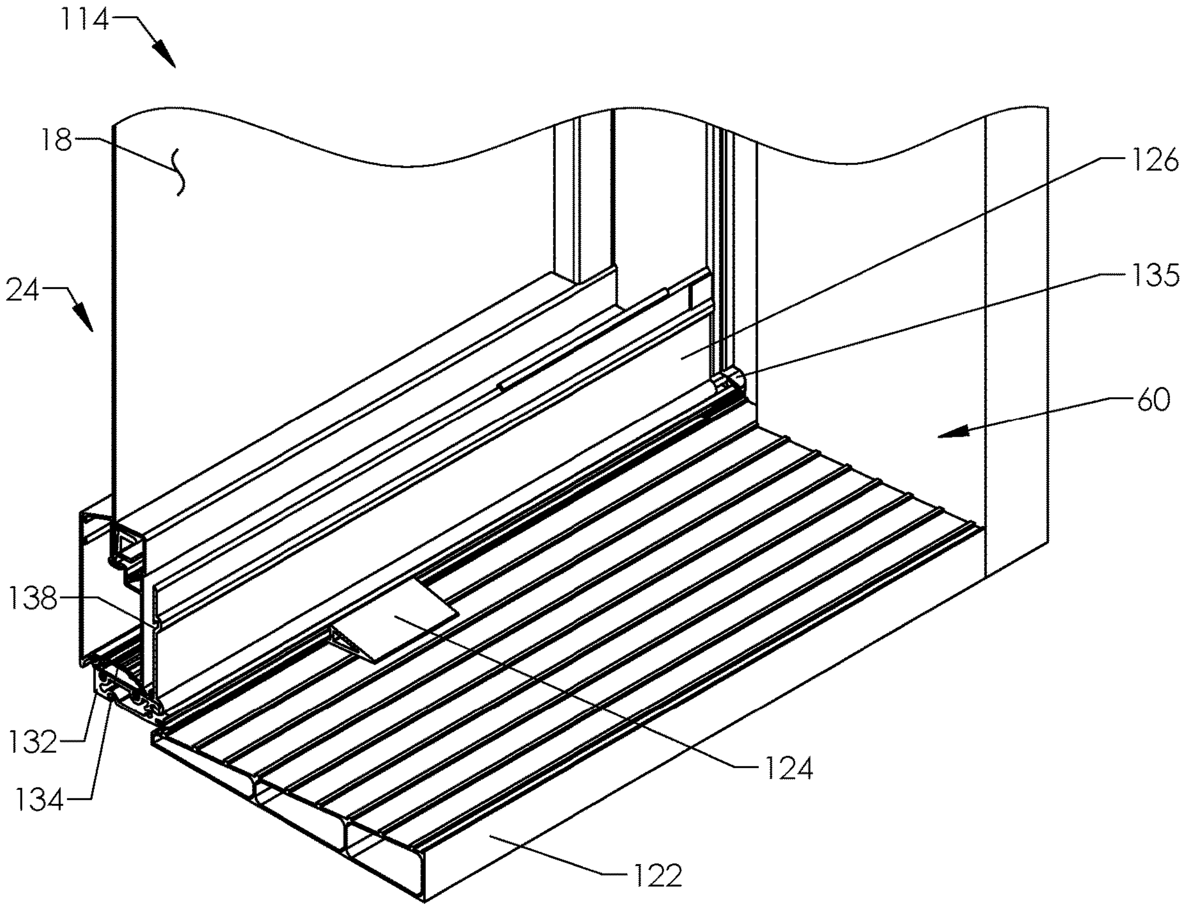
FIG. 15 is an isometric view of a sill during installation, where the door assembly support is resting on the primary door sill.

FIG. 15 is an isometric view 114 of a portion of a partially installed door assembly 10 with sill transition 126 in a raised position with respect to the primary door sill 122. Also shown is an example bottom corner seal 135 adjacent to the threshold. The bottom corner seal 135 can be utilized to facilitate installation of the door assembly 10, and/or for sealing various sill corners or gaps. The bottom corner seal 135 can be a flexible and/or elastomeric piece that is attachable to an end of the sill frame 132. In preferred embodiments, two bottom corner seals 135 are utilized, including one at each end of the sill frame 132. In some embodiments, the bottom corner seals 135 can operate in conjunction with the sill extenders 136 or 140.

Figure 16:
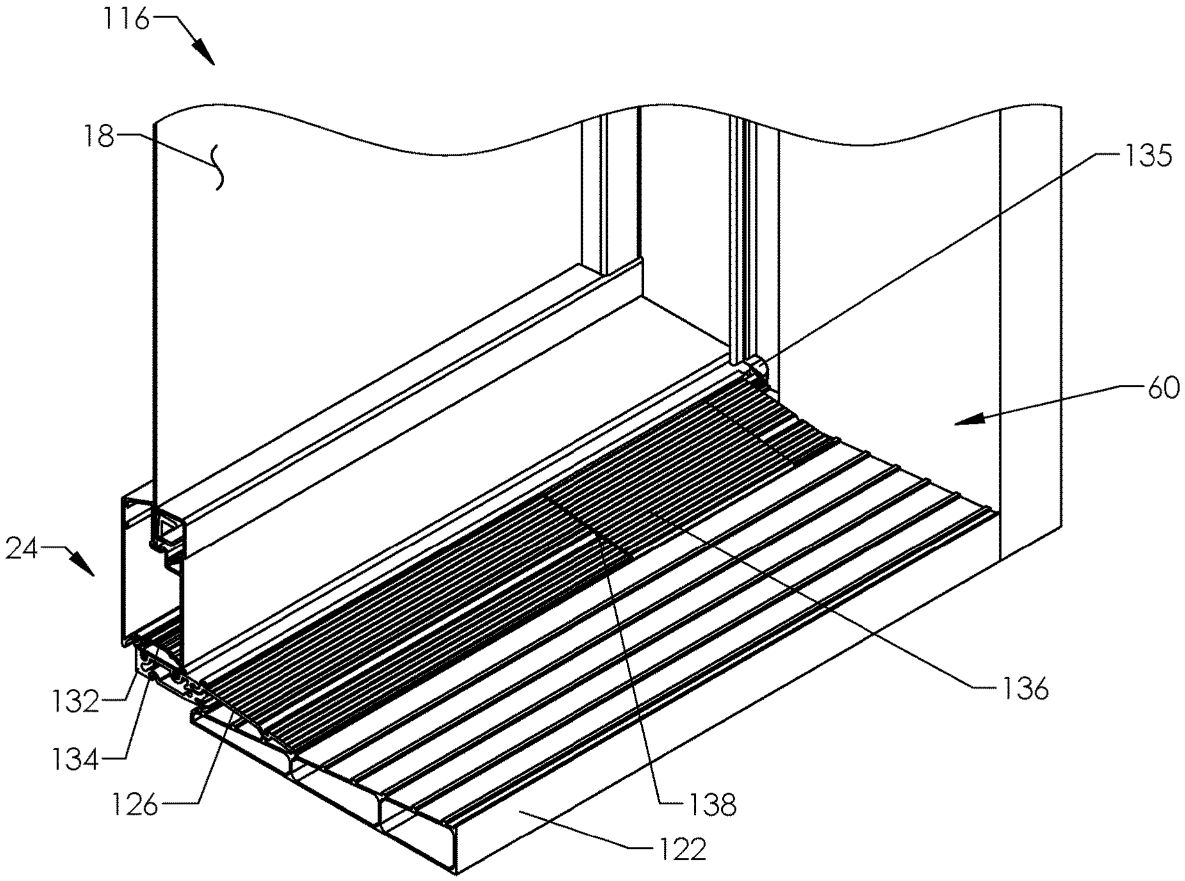
FIG. 16 is an isometric view of the sill of FIG. 15 with sill extenders untrimmed and in a shipping position.
Figure 17:
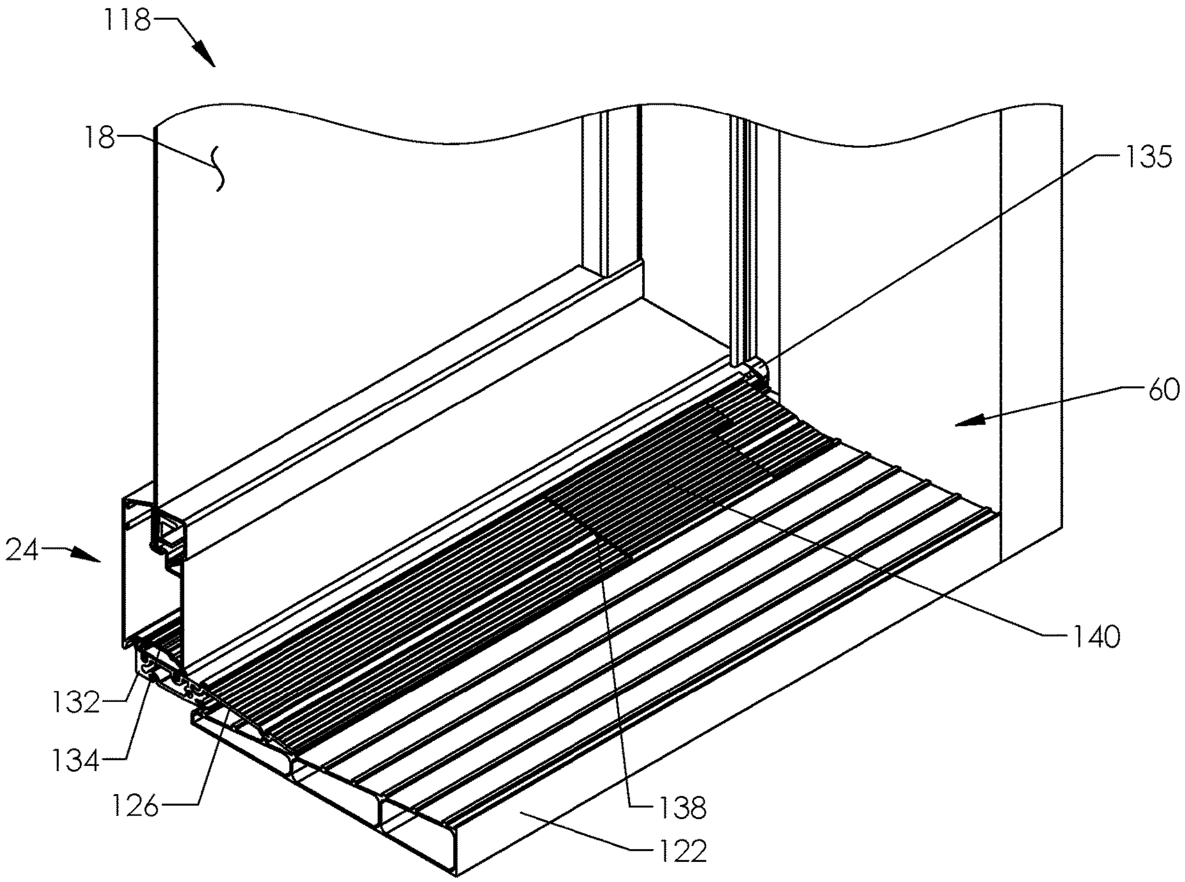
FIG. 17 is an isometric view of the sill of FIG. 15 with sill extenders trimmed but not yet extended.
Figure 18:
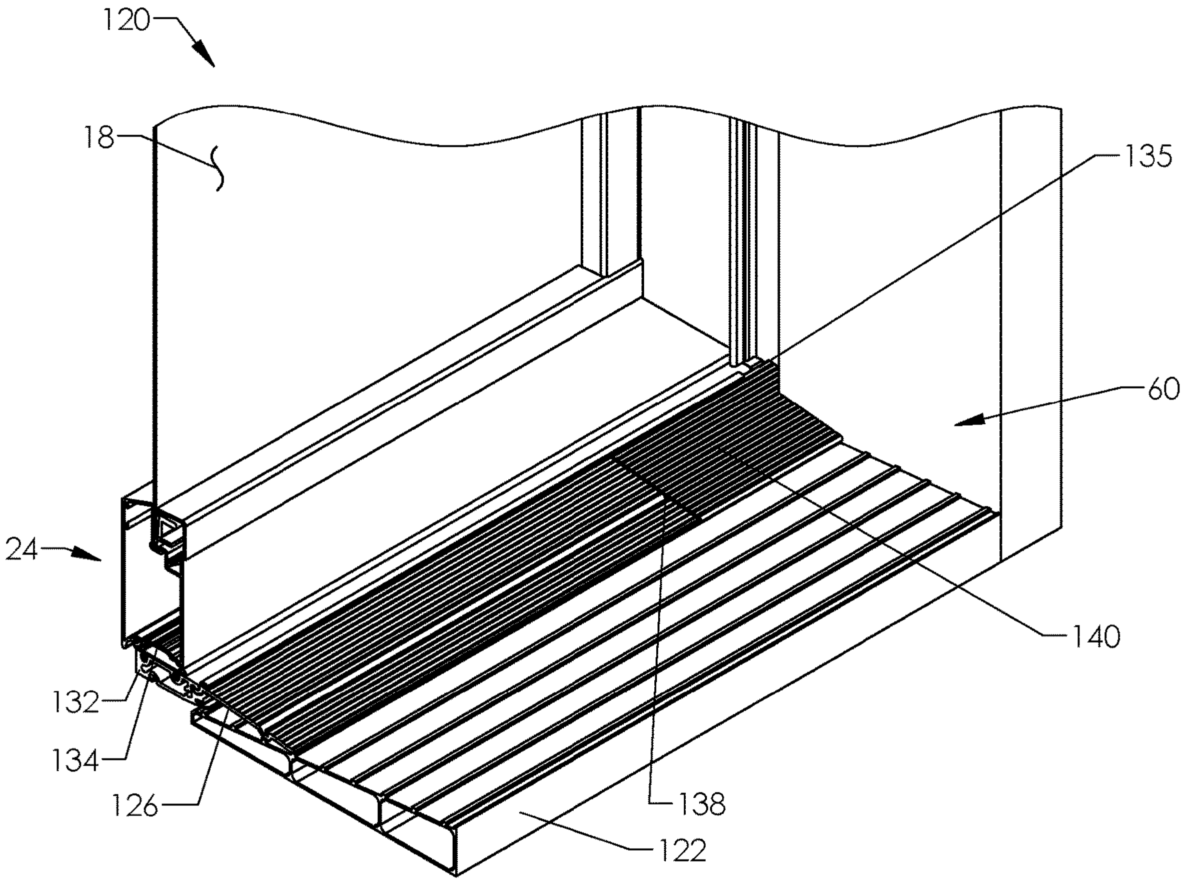
FIG. 18 is an isometric view of the sill of FIG. 15 with sill extenders trimmed and extended as installed.

FIG. 16 is an isometric view 116 of the sill portion of FIG. 15 in a lowered position in contact with primary door sill 122, and with sill extenders 136 untrimmed and in a shipping position. FIG. 17 is an isometric view 118 of the sill portion of FIG. 15 with sill extenders 140 trimmed but not yet extended. FIG. 18 is an isometric view 120 of the sill portion of FIG. 15 with sill extenders 140 trimmed and extended as installed. Other variations of the above are also contemplated.

Figure 19:
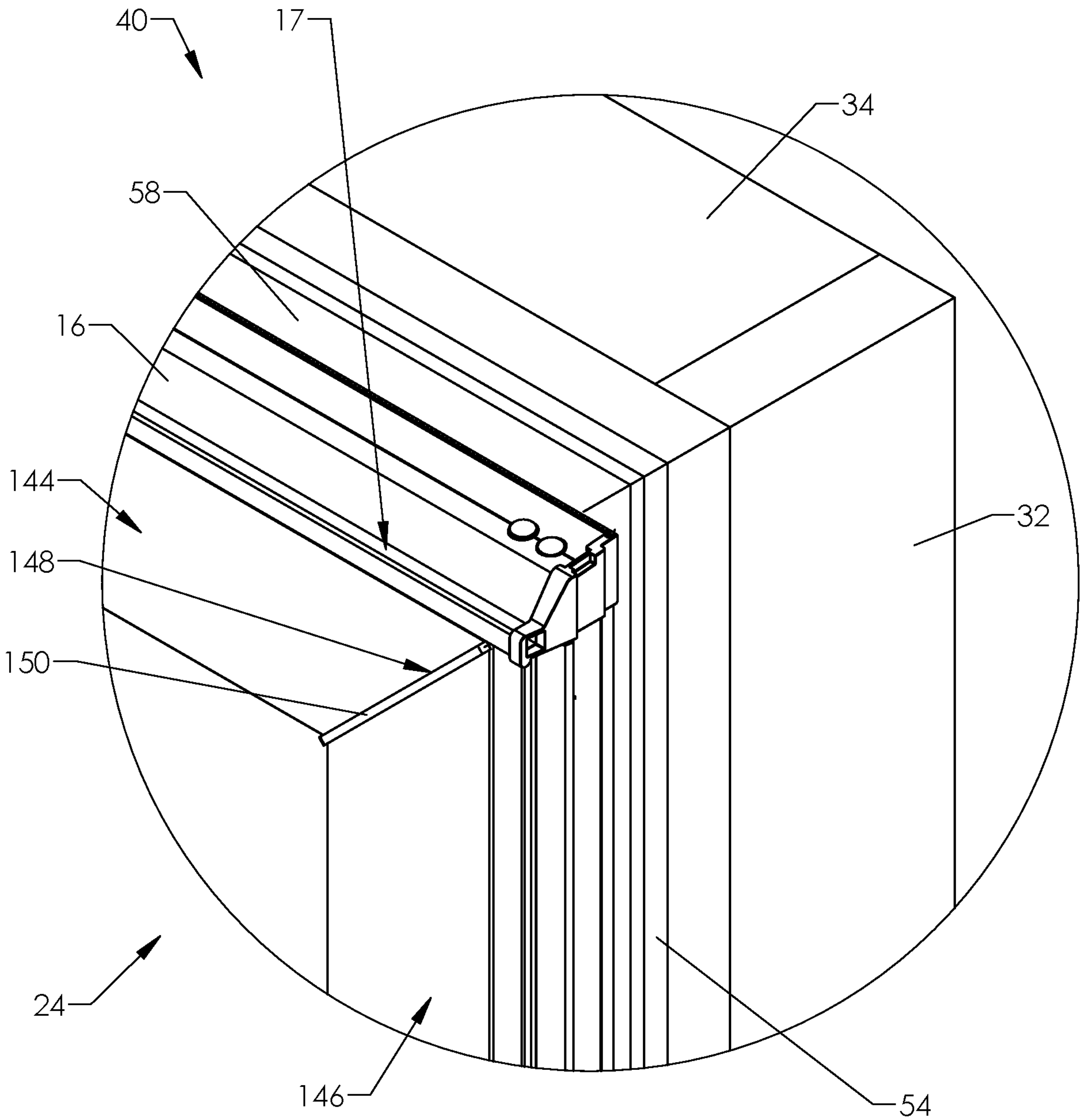
FIG. 19 is an enlarged isometric view of an upper right door corner shown in FIG. 2, with a gusset assembly in assembled form.
Figure 20:
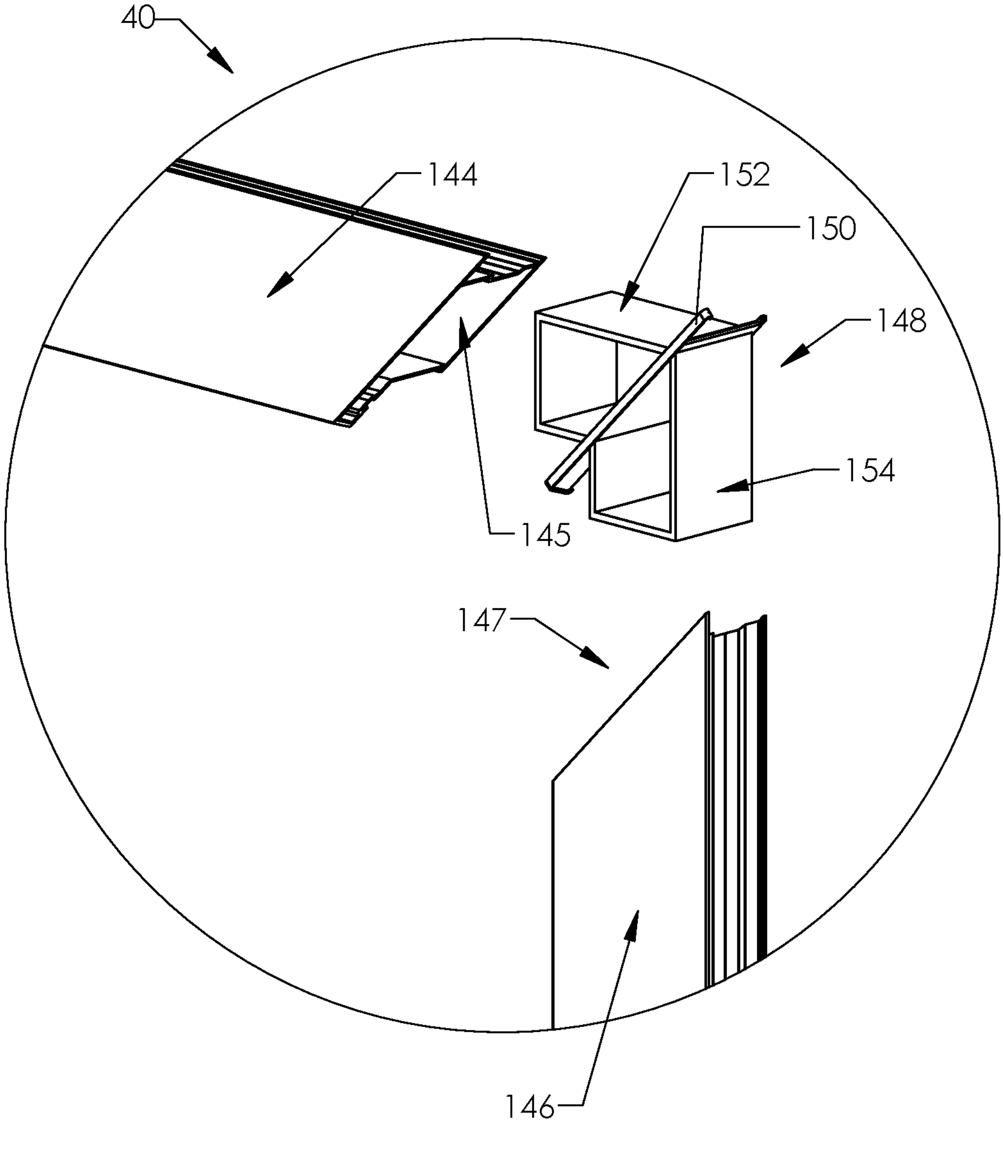
FIG. 20 is an isometric exploded view of the door corner with the gusset assembly of FIG. 19.
Figure 21:
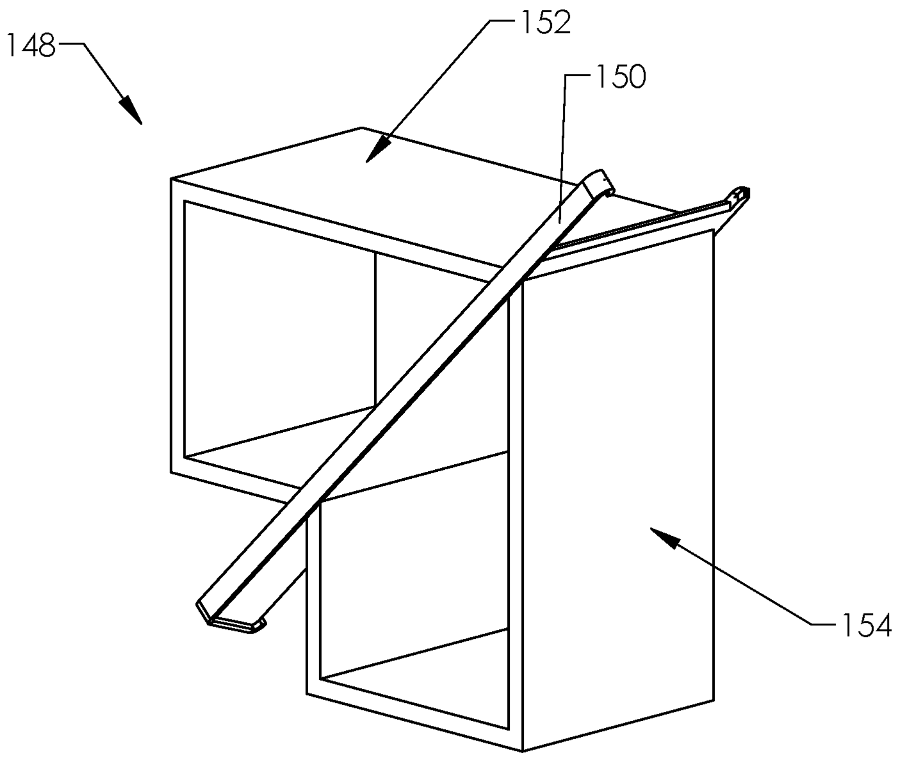
FIG. 21 is an isometric view of the gusset assembly of FIG. 19.

FIGS. 19-21 show a corner portion of door 24 in greater detail with an optional gusset assembly 148 with a junction cover 150. In some cases, door 24 can be constructed from a first portion 144 and a second portion 146. As shown the first portion 144 can be an upper portion and the second portion 146 can be a side portion of the door 24. As two portions of the door are joined, a miter can be used, e.g., at a 45-degree angle. In other cases, two door portions can be brought together as more of a butt-joint that can also be provided with a junction cover that is configured to cover the joint area. In yet other cases, two door portions can be adjacent to each other in a different configuration than a miter joint or butt joint. In some cases, there may be a desire to add strength and/or improve an appearance of a miter joining the first and second portions 144, 146. Therefore, a gusset assembly 148 is disclosed with an optional junction or miter cover 150 that can strengthen the door 24 and also improve aesthetics of the door 24.

FIG. 19 is an isometric view of an exemplary door corner 40 with gusset assembly 148 with junction cover 150 in assembled form. In more detail, FIG. 20 is an isometric exploded view of the door corner 40 with gusset assembly 148 with junction cover 150 of FIG. 19. FIG. 21 is an isometric view of the gusset assembly 148 with junction cover 150 of FIG. 19. As shown, the gusset assembly 148 can be a unitary piece that begins separately from other portions of the door 24. In some embodiments, the gusset assembly can be made of one or more metals, such as zinc, and/or high-strength plastic, such as fiber-reinforced resin, among others.

The gusset assembly can have a substantially "L" shape, and can include a first portion 152 and a second portion 154 that form a 90-degree angle. The first portion 152 can be configured to be inserted into a first recessed opening 145 in the first portion 144 of the door 24, and the second portion 154 can be configured to be inserted into a second recessed opening 147 in the second portion 146 of the door 24. It is understood that more than one gusset assembly 148 as described herein could be employed on a single door 24, e.g., one gusset assembly 148 for each corner of a door 24, for a total of four gusset assemblies 148. Optionally, the gusset assembly 148 can include a T-shaped junction cover 150 that can be sized to follow a miter joint between the first 144 and second 146 portions. The junction cover 150 can have a width (transverse to its length that runs along the miter joint) selected to sufficiently cover various cuts and/or imperfections in the various first 144 and/or second portions 146 of the door 24. The gusset assembly 148 can be solid or can be at least partially hollow as shown.

Figure 22:
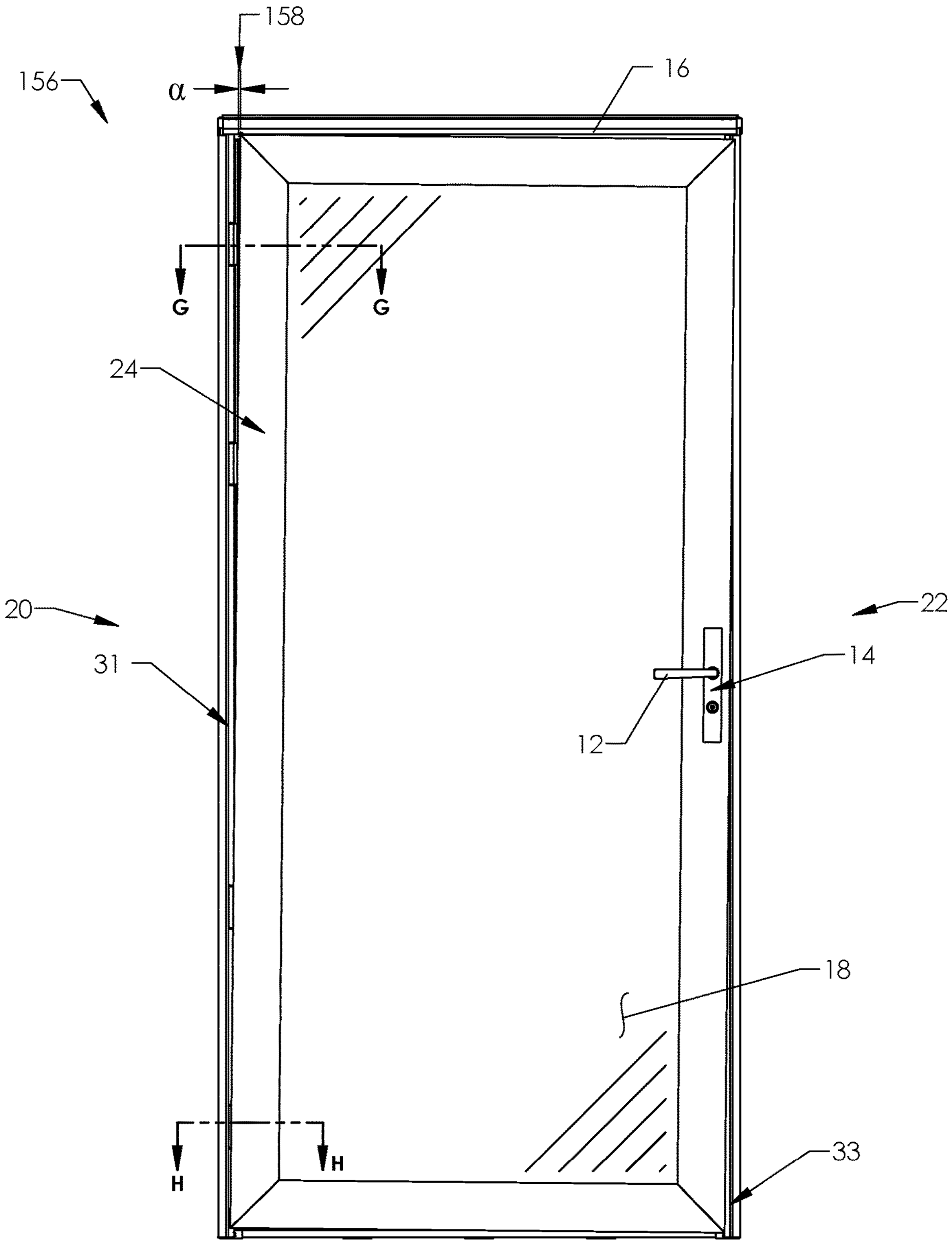
FIG. 22 is a front elevation view of an example door system with exaggerated door sag.

FIG. 22 is a front elevation view of an example door system 156 with exaggerated door sag with a sag angle (a) 158. It is common for doors 24 mounted on hinges such as one or more hinge assembly 159 on a single side (hinge side 20 via hinge-side vertical bar 31) to experience such sag (with a corresponding sag angle 158) that is particularly pronounced at a side of the door 24 furthest from the hinges (latch side 22 via latch-side vertical bar 33). The sag angle 158 may be a fraction of a degree, but it may still be perceptible by a user and is therefore undesirable. Other possible drawbacks related to door sag can include undesirable sounds or rubbing, premature wear of various parts, and reduced weather seal characteristics, among others. In order to avoid such a gap at a top or side of a door 24, an improved anti-sag hinge assembly 165 is provided, which is composed of a door hinge portion 160 and a modified frame hinge portion 163 that are shaped and sized to pre-emptively compensate for door sag, thereby substantially eliminating the sag angle 158 (i.e., an angle of substantially zero degrees). By merely changing the geometry of the frame hinge portion 163 of the hinge assembly 165, the sag angle 158 can be substantially reduced or eliminated.

Door sag can be due to a single factor or a combination of factors. A common factor in the door sag is play or looseness between various parts of the individual door hinge assemblies 159. The play or looseness can be very small and can be nearly imperceptible until a door 24 is hung. For example, play can be between various door hinge assembly components, such as a frame hinge portion, a door hinge portion, a hinge pin, and/or various hinge bushing components Hinge pins can be retractable and/or spring-loaded for easy installation according to various embodiments. In some embodiments, the retractable hinge pin can retract when the hinge assembly is being assembled (e.g., prior to shipment). The hinge assembly can also include one or more bushings to facilitate a rotatable connection once assembled.

Moreover, a corresponding but opposite movement may occur in hinge assemblies at opposed upper or lower portions of a door according to a number of hinge assemblies used, and the positioning of the hinge assemblies on a hinge-side vertical bar. Other example factors in door sag include flexing of the door itself, intentional or unintentional tolerances due to manufacturing, weight of the door, and flexing of the hinge-side vertical bar, aging or bending of components over time, among many others.

Figure 23:
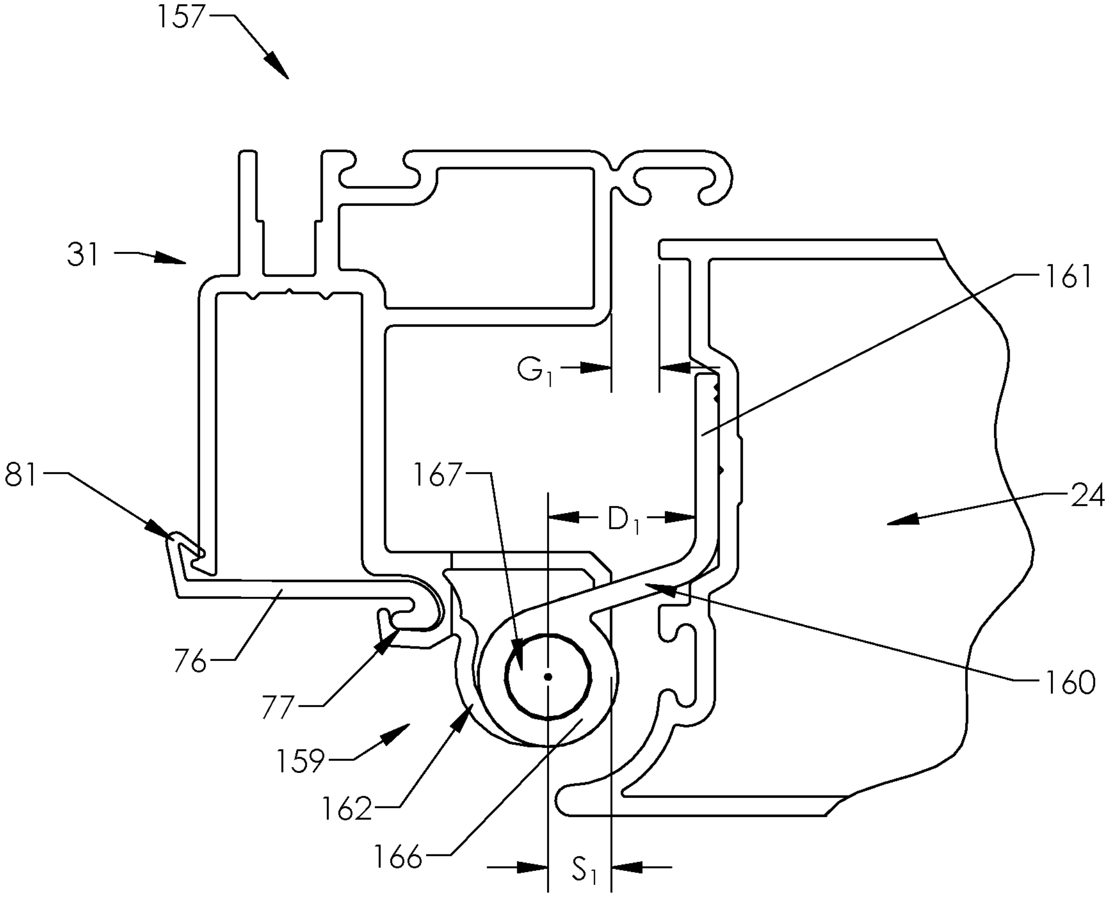
FIG. 23 is a vertical cross section view showing a hinge assembly taken along section line G-G of FIG. 22.
Figure 24:
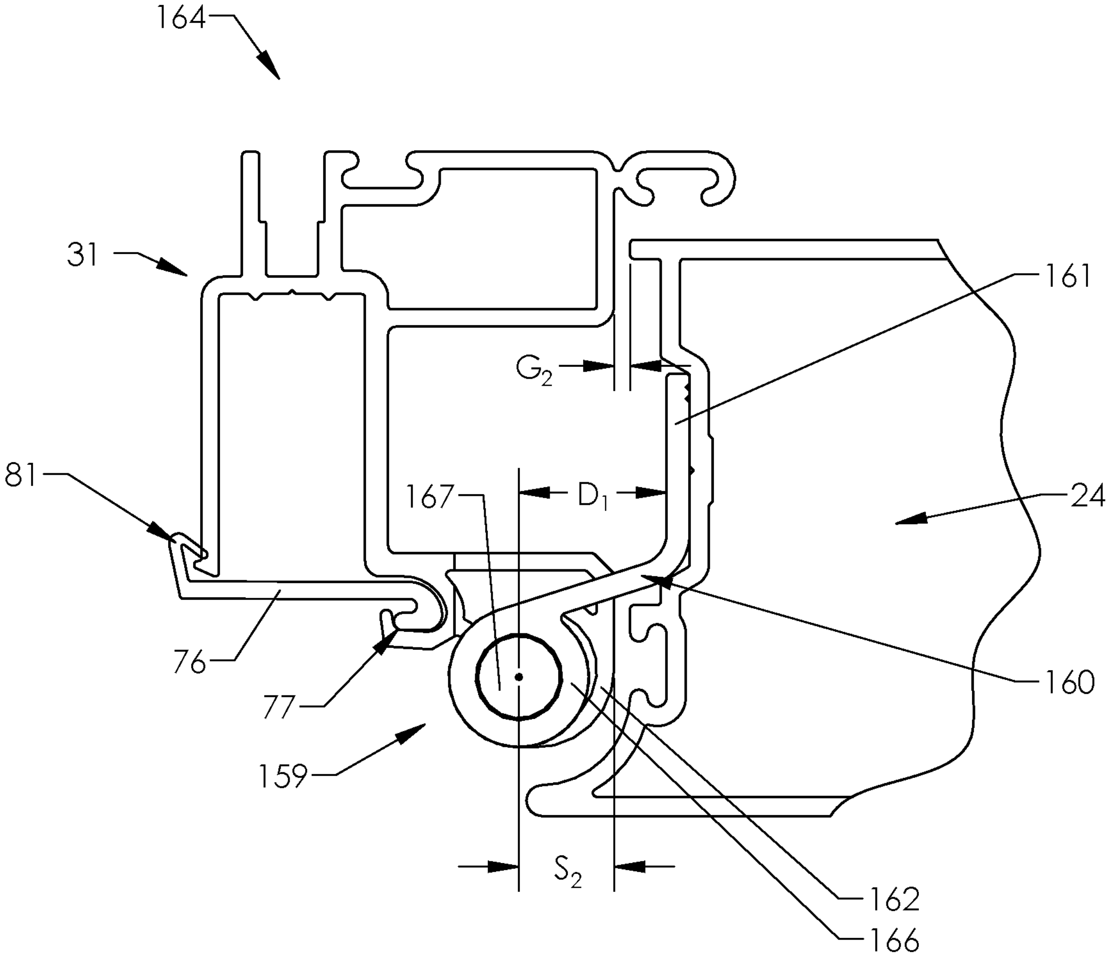
FIG. 24 is a vertical cross section view showing a hinge assembly taken along section line H-H of FIG. 22.
Figure 25:
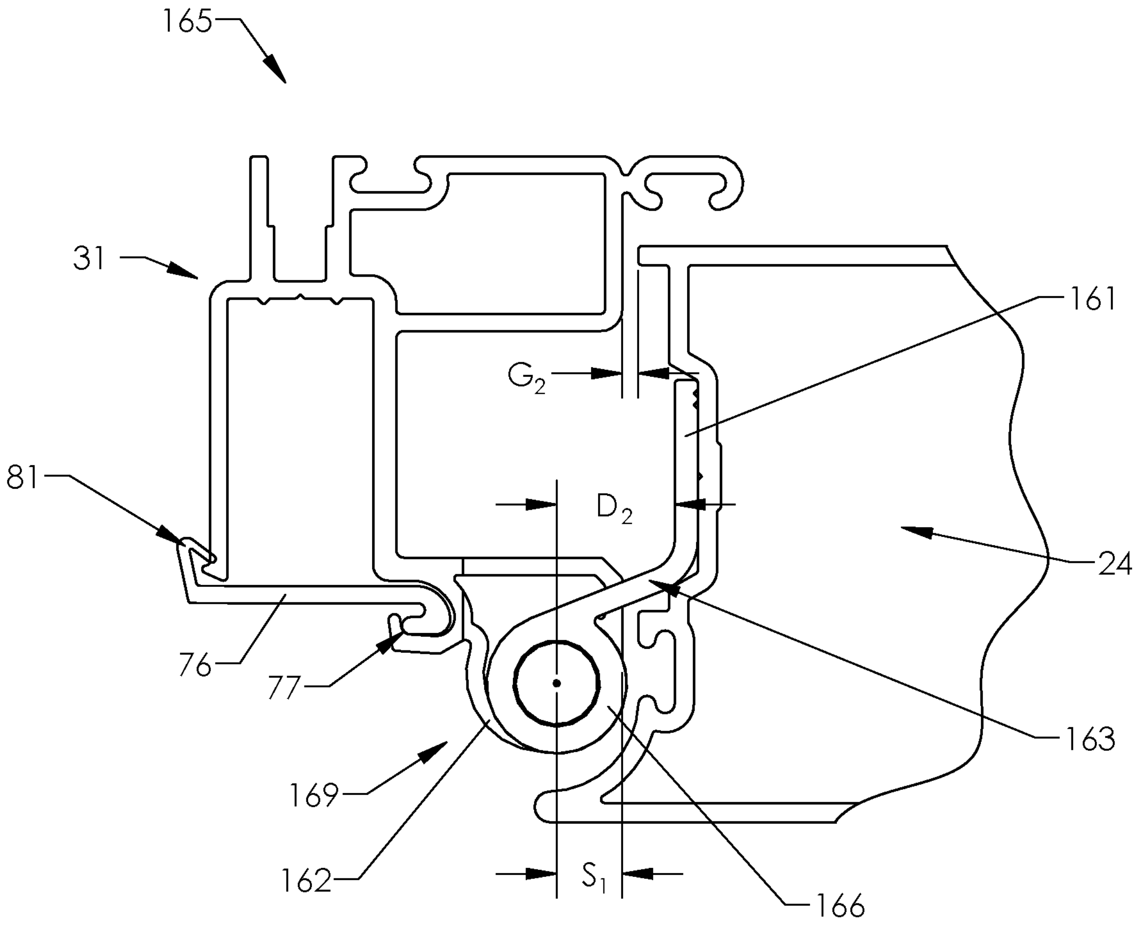
FIG. 25 is a vertical cross section view showing an anti-sag hinge assembly taken along section line G-G of FIG. 22.

FIGS. 23-25 illustrate various hinge aspects and how one or more embodiments of hinges can be sized in order to reduce the sag angle 158. In the examples shown in FIGS. 23 and 24, a door 24 is connected to a hinge-side vertical bar 31 with two unmodified hinges (e.g., a hinge assembly 157 at an upper portion of the door 24 and another hinge assembly 159 at a lower portion of the door 24).

It is typical for existing hinge assemblies located at uppermost or lowermost portions of the hinge-side vertical bar 31 to be more subject to play and therefore to contribute disproportionately to door sag. In some cases, only a hinge assembly at an uppermost portion of the hinge-side vertical bar 31 may contribute substantially to door sag. As shown in view 165 of FIG. 25, an improved, modified hinge assembly 169 can be configured to at least partially compensate for door sag. As contemplated herein, two or more hinge assemblies can rotatably connect the door 24 to the hinge-side vertical bar 31 of the door assembly 10. However, three, four, or more hinge assemblies can also be employed as would be understood. One or more modified hinge assemblies 169 can be implemented in various anti-sag embodiments. In some preferable embodiments, four or more hinge assemblies are used to connect the door 24 and the hinge-side vertical bar 31.

In particular, FIG. 23 shows a cross-sectional view 157 of an upper hinge assembly 159 and hinge-side vertical bar 31 taken along section line G-G of FIG. 22. As shown, the hinge assembly 159 is a barrel-type pivotable hinge assembly, composed of a door hinge portion 160 attached to a door 24 via a flange portion 161 and the frame hinge portion 162 attached to the hinge-side vertical bar 31. A barrel portion 166 of the door hinge portion 160 can be rotatably connected to a portion of the frame hinge portion 162 via a hinge pin 167 to create a rotatable connection in hinge assembly 159. At least in part due to a weight of the door 24 supported by the various hinge portions, the door hinge portion 160 can move and displace relative to the frame hinge portion 162. View 157 can be representative of an upper hinge that has not been modified to compensate for sag. Therefore, an undesirable gap $G_1$ is present.

As used in FIGS. 23-25, $G_1$ represents a first gap, $G_2$ represents a second gap, $D_1$ represents a first hinge axis to flange distance, and $D_2$ represents a second hinge axis to flange distance, $S_1$ represents a first hinge axis to door hinge offset, and $S_2$ represents a second hinge axis to door hinge offset. According to various embodiments, $G_1$ can be greater than $G_2$, which represents a jamb or other gap resulting from sag angle 158. In some embodiments, the gap $G_2$ can be preferable to the gap $G_1$. Gap $G_2$ can be calculated as the gap $G_1-(S_2-S_1)$, where $S_1<S_2$. Therefore, a change in hinge dimensions required to compensate for a sag angle 158 can be equal to about $S_2-S_1$, where $D_1>D_2$, and $D_2$=approx. $D_1-(S_2-S_1)$. Using the above formulas, an improved hinge assembly 165 can be configured to compensate for door sag, though adjustment may be required to account for other door sag factors previously mentioned.

FIG. 24 is a cross-sectional view 164 of a lower hinge assembly 164 taken along section line H-H of FIG. 22. As shown the lower hinge portion 164 also has a door hinge portion 160 similar to upper hinge portion 157. FIG. 24 shows a hinge assembly 159 in a lower position, causing a smaller and therefore more desirable gap $G_2$. A modified hinge assembly, e.g., an upper hinge assembly, described herein may seek to achieve a gap comparable to gap G 2 in a hinge assembly located near a top of the hinge-side vertical bar.

FIG. 25 is a cross-sectional view 165 of a modified (e.g., upper) hinge assembly 169 taken along section line G-G of FIG. 22. The modified hinge assembly 169 has a modified frame hinge portion 163 that has been adjusted and sized to minimize a gap $G_2$ between the door 24 and hinge-side vertical bar 33, as shown. As modified, the gap of upper hinge assembly 157 of $G_1$ is reduced to the gap of the lower hinge assembly 164, thereby substantially eliminating the sag angle 158. Although the modified hinge assembly 169 is described as an upper hinge assembly, it is also contemplated that the modified hinge assembly 169 can be located in another suitable location along a hinge-side vertical bar 31, including on a lower, middle, or other position on the hinge-side vertical bar 31. Moreover, two or more modified hinge assemblies 169 can be implemented to connect the door 24 to the hinge-side vertical bar 31. For example, in a case where four hinge assemblies connect a door 24 to a hinge-side vertical bar, a topmost hinge assembly and a second-to-topmost hinge assembly can be modified hinge assemblies 169, and the remaining hinge assemblies can be standard hinge assemblies 159.

In yet further embodiments, all or several hinge assemblies can be modified hinge assemblies 169. In one embodiment, each hinge assembly of a plurality of hinge assemblies connecting the door 24 to the hinge-side vertical bar 31 can be a modified hinge assembly 169. However, the plurality of modified hinge assemblies 169 can be modified in a specific fashion, e.g., based on location and/or characteristics of the particular location of each modified hinge assembly 169 on the hinge-side vertical bar 31. In one particular embodiment, the modified hinge assemblies 169 can be progressively sized and configured such that a topmost hinge assembly 169 has a greater amount of compensation for the door sag, and a lowermost hinge assembly has a minimal amount (or none at all) of compensation for the door sag, among many other variations and combinations.

Various modifications and alternations of this disclosure will become apparent to those skilled in the art without departing from the scope and principles of this disclosure, and it should be understood that this disclosure is not to be unduly limited to the illustrative embodiments set forth hereinabove.

What is claimed is:

1. A building system comprising:

a frame comprising:

a first horizontal member comprising a first end and an opposite second end;

a first vertical bar downwardly extending from the first end of the first horizontal member; and a second vertical bar downwardly extending from the second end of the first horizontal member; and a panel attachable to the frame;

wherein at least one of the first horizontal member and the first and second vertical bars comprises at least one fastener-receiving portion and an integrated fastener cover that is moveable from an open position in which it does not cover the fastener-receiving portion to a closed position in which it covers the fastener-receiving portion, and wherein the integrated fastener cover is attached to at least one of the first horizontal member and the first and second vertical bars during movement between the open position and the closed position.

2. The building system of claim 1, wherein the frame is preassembled as a pre-hung door.

3. The building system of claim 1, wherein the first horizontal member is positioned at a top of the frame, and wherein the frame further comprises a second horizontal member positioned at a bottom of the frame.

4. The building system of claim 1, wherein at least one of the first horizontal member and the first and second vertical bars comprises a recessed fastener-receiving channel that comprises the at least one fastener-receiving portion.

5. The building system of claim 1, wherein the integrated fastener cover comprises:

a hinge connector at a first end; and a closure feature at a second end that interfaces with a portion of the fastener-receiving portion in the closed position of the integrated fastener cover.

6. The building system of claim 5, wherein the closure feature is located at an interface between the integrated fastener cover and at least one of a horizontal mounting frame of the first horizontal member and a vertical mounting frame of one of the first and second vertical bars.

7. The building system of claim 1, wherein the integrated fastener cover is pivotably attached to at least one of one of the first horizontal member and the first and second vertical bars that comprises the fastener-receiving portion.

8. The building system of claim 1, wherein the frame comprises one of a door frame and a window frame, and wherein the panel comprises one of a door and a window, respectively.

9. A method of installing the building system of claim 1 to a building, comprising the steps of:
positioning the building system adjacent to a building opening; and
attaching the building system to the building opening by driving a fastener through at least one fastener-receiving portion of at least one of the first horizontal member and the first and second vertical bars.

10. The method of claim 9, further comprising the step of:
closing the fastener cover over the fastener-receiving portion to at least partially conceal the fastener from view after the step of attaching the building system to the building opening.

11. A building system comprising:
a frame comprising:
a horizontal member comprising a first end and an opposite second end;
a first vertical bar downwardly extending from the first end of the horizontal member; and
a second vertical bar downwardly extending from the second end of the horizontal member; and
a panel attachable to one of the horizontal member and the first and second vertical bars of the frame, wherein the panel comprises a first portion adjacent to a second portion at a first corner junction;
wherein the panel comprises at least a first gusset assembly comprising a junction cover that extends above an external face of the panel and extends along at least a portion of the first corner junction between the first and second portions of the panel.

12. The building system of claim 11, wherein the junction cover is configured to give the first corner junction a substantially seamless appearance when the panel is assembled.

13. The building system of claim 11, wherein the first gusset assembly comprises a generally L-shaped member comprising:
a first leg that is positionable in a first recessed opening of the first portion of the panel; and
a second leg that is positionable in a second recessed opening of the second portion of the panel;
wherein the junction cover further comprises:
a junction cover length that extends along a first corner junction length; and
a junction cover width transverse to the junction cover length that is sufficient to overlap a portion of at least one of the first and second portions of the panel adjacent to the first corner junction.

14. The building system of claim 11, wherein the junction cover comprises a substantially T-shaped cross-section.

* * * * *